(12) United States Patent
Tanada

(10) Patent No.: US 10,808,661 B2
(45) Date of Patent: Oct. 20, 2020

(54) FUEL INJECTION DEVICE

(71) Applicant: DENSO CORPORATION, Kariya, Aichi-pref. (JP)

(72) Inventor: Hiroki Tanada, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/533,863

(22) Filed: Aug. 7, 2019

(65) Prior Publication Data

US 2019/0360441 A1 Nov. 28, 2019

Related U.S. Application Data

(63) Continuation of application No. PCT/JP2017/046328, filed on Dec. 25, 2017.

(30) Foreign Application Priority Data

Dec. 22, 2017 (JP) .................................. 2017-031369

(51) Int. Cl.
*F02M 47/02* (2006.01)
*F02M 39/02* (2006.01)
(Continued)

(52) U.S. Cl.
CPC .......... *F02M 39/02* (2013.01); *F02M 47/025* (2013.01); *F02M 55/025* (2013.01); *F02M 61/16* (2013.01)

(58) Field of Classification Search
CPC .... F02M 39/02; F02M 47/025; F02M 47/027; F02M 55/025; F02M 61/16; F02M 63/0061; F02M 63/0029; F02D 41/38
(Continued)

(56) References Cited

U.S. PATENT DOCUMENTS 6,244,245 B1 * 6/2001 Boecking ............... F02M 45/08
123/300
6,471,142 B1 * 10/2002 Lambert ................ F02M 45/08
239/88
(Continued)

FOREIGN PATENT DOCUMENTS

| JP | 2000-297719 | 10/2000 |
|---|---|---|
| JP | 2018-135821 | 8/2018 |
| WO | 2017/145560 | 8/2017 |

*Primary Examiner* — Hai H Huynh
*Assistant Examiner* — Gonzalo Laguarda
(74) *Attorney, Agent, or Firm* — Nixon & Vanderhye PC

(57) ABSTRACT

A fuel injection device includes a valve mechanism and a drive unit. The valve mechanism includes a first control valve body driven by a drive unit to open and close an outflow opening portion, a hydraulically actuated valve body for opening and closing an inflow opening portion by a pressure difference, and a second control valve body driven by the drive unit through the first control valve body. When a first drive energy is input to the drive unit, the second control valve body maintains a seated state on the hydraulically actuated valve body. When the second drive energy is input to the drive unit, the second control valve body is unseated from the hydraulically actuated valve body. According to the seating and unseating of the second control valve body, a flow channel area of a communication passage for communicating an upper control chamber portion with a lower control chamber portion is switched to another.

16 Claims, 9 Drawing Sheets

(51) Int. Cl.
*F02M 55/02* (2006.01)
*F02M 61/16* (2006.01)

(58) Field of Classification Search
USPC ....... 123/445, 457, 510, 511; 239/92, 533.8, 239/584
See application file for complete search history.

(56) References Cited

U.S. PATENT DOCUMENTS

| | | |
|---|---|---|
| 8,544,767 B2 * | 10/2013 | Adachi ................ F02M 55/002 239/124 |
| 2006/0106000 A1 | 5/2006 | Nicolau et al. |
| 2006/0241086 A1 | 10/2006 | Nicolau et al. |
| 2006/0258626 A1 | 11/2006 | Nicolau et al. |
| 2007/0135389 A1 | 6/2007 | Nicolau et al. |
| 2009/0029951 A1 | 1/2009 | Nicolau et al. |
| 2009/0200406 A1 | 8/2009 | Kronberger |
| 2010/0029593 A1 | 2/2010 | Nicolau et al. |
| 2010/0029594 A1 | 2/2010 | Nicolau et al. |
| 2010/0267674 A1 | 10/2010 | Nicolau et al. |
| 2010/0301143 A1 | 12/2010 | Adachi et al. |
| 2012/0003161 A1 | 1/2012 | Nicolau et al. |
| 2012/0010174 A1 | 1/2012 | Nicolau et al. |
| 2012/0035137 A1 | 2/2012 | Fylaktakidou et al. |
| 2012/0094961 A1 | 4/2012 | Nicolau et al. |
| 2014/0179635 A1 | 6/2014 | Nicolau et al. |
| 2014/0194391 A1 | 7/2014 | Nicolau et al. |
| 2017/0027966 A1 | 2/2017 | Nicolau et al. |

* cited by examiner

US 10,808,661 B2

FUEL INJECTION DEVICE

CROSS REFERENCE TO RELATED APPLICATION

The present application is a continuation application of International Patent Application No. PCT/JP2017/046328 filed on Dec. 25, 2017, which designated the U.S. and claims the benefit of priority from Japanese Patent Application No. 2017-31369 filed on Feb. 22, 2017. The entire disclosures of all of the above applications are incorporated herein by reference.

TECHNICAL FIELD

The present disclosure relates to a fuel injection device.

BACKGROUND

Conventionally, a fuel injection device has been used for an internal combustion chamber to inject fuel.

SUMMARY

According to one aspect of the present disclosure, a fuel injection device includes a valve body, a nozzle needle, a valve mechanism, and a drive unit. The nozzle needle is movable relative to the valve body to open and close the nozzle hole. The valve mechanism defines a pressure control chamber in the valve body. The drive unit is configured to drive the valve mechanism.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
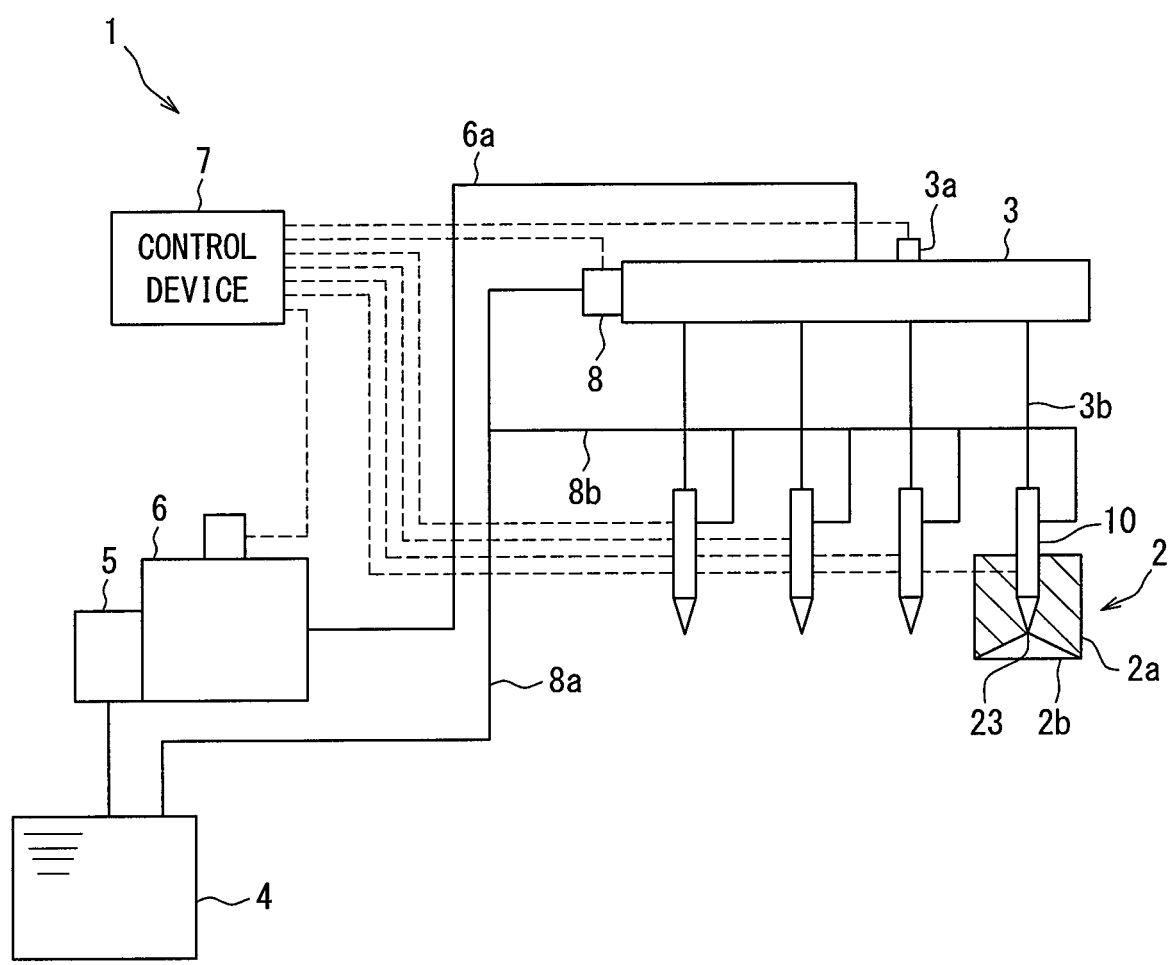
FIG. 1 is a diagram showing an overall configuration of a fuel supply system employing a fuel injection device according to a first embodiment.

To begin with, examples of the present disclosure will be described.

A fuel injection device according to one example of the present disclosure, a piston and a needle valve are displaceable according to a variation in a fuel pressure of a pressure chamber formed in an injector body thereby to open and close an injection hole. The fuel pressure in the pressure chamber is controlled by using a solenoid thereby to open and close a valve body between the pressure chamber and a fuel outlet chamber.

According to another example, a fuel injection device may be provided with two valve bodies and two solenoids. This configuration could individually control a valve opening of each valve body by using each solenoid thereby to enable to manipulate a mode of a fuel pressure drop in the pressure chamber. As a result, the configuration may enable to switch the injection rate characteristics of the fuel injection depending on an operating condition.

However, the fuel injection device of this configuration requires multiple drive units such as solenoids individually to control the opening and closing of two valve bodies. In addition, the fuel injection device of this configuration may further require a valve body for closing a filling orifice which allows fuel to flow into the pressure chamber. Without the valve body for closing the filling orifice, even after the valve body between the pressure chamber and the fuel outlet chamber is opened, an inflow of the fuel from the filling orifice into the pressure chamber could be continued. As a result, a drop of the fuel pressure in the pressure chamber may become slow. Consequently, the response of the piston and the needle valve and thus the response of injection could be hardly improved. In order to solve those issues, it is conceivable to add the valve body that closes the filling orifice. However, in order to close the additional valve body, an additional drive unit could be required or an increased load on the drive unit could be caused.

According to one aspect of the present disclosure, a fuel injection device is configured to inject fuel from an injection hole toward a combustion chamber. The fuel injection device comprises a valve body having the injection hole, a pressure control chamber configured to be filled with fuel, an inflow passage configured to allow fuel to flow into the pressure control chamber, and an outflow passage configured to allow fuel to flow out of the pressure control chamber, in which an inflow opening portion of the inflow passage and an outflow opening portion of the outflow passage are opened in an opening wall defining the pressure control chamber. The fuel injection device further comprises a nozzle needle configured to be displaced relative to the valve body according to a variation in the fuel pressure in the pressure control chamber to open and close the nozzle hole. The fuel injection device further comprises a valve mechanism that partitions the pressure control chamber into an upper control chamber portion, which faces the outflow opening portion, and a lower control chamber portion, and has at least one communication passage which communicates the upper control chamber portion with the lower control chamber portion, the valve mechanism configured to open and close the outflow opening portion and the inflow opening portion and to switch a flow channel area of the communication passage. The fuel injection device further comprises a drive unit configured to drive the valve mechanism and to increase and decrease an input drive energy. The valve mechanism includes a first control valve body configured to be seated on and unseated from the opening wall by the drive of the drive unit and to open or close the outflow opening portion. The valve mechanism further includes a hydraulically actuated valve body slidable on an outer peripheral surface of the first control valve body, the hydraulically actuated valve body configured to be seated on and unseated from the opening wall by a pressure difference generated between the upper control chamber portion and the lower control chamber portion and to open or close the inflow opening portion. The valve mechanism further includes a second control valve body configured to be seated on and unseated from the hydraulically actuated valve body while being driven by the drive unit via the first control valve body and to switch the communication passage from a first throttle state to a second throttle state larger in flow channel area than the first throttle state. The hydraulically actuated valve body is configured to close the inflow opening portion by a force received from the fuel in the lower control chamber portion due to a communication between the upper control chamber portion and the outflow passage by unseating the first control valve body. The communication passage is configured to control an outflow flow rate of the fuel from the lower control chamber portion to the outflow passage in a state where the hydraulically actuated valve body closes the inflow opening portion. the drive unit is configured to receive a first drive energy to cause the first control valve body to be unseated from the opening wall while maintaining the seating of the second control valve body on the hydraulically actuated valve body and to cause the fuel to flow from the lower control chamber portion to the outflow passage through the communication passage in the first throttle state. The drive unit is configured to receive a second drive energy larger than the first drive energy to cause both of the first control valve body and the second control valve body to be unseated and to cause the fuel to flow from the lower control chamber portion to the outflow passage through the communication passage in the second throttle state.

The valve mechanism according to the present aspect has the hydraulically actuated valve body which is unseated from and seated on the opening wall by a pressure difference generated between the upper control chamber portion and the lower control chamber portion and opens and closes the inflow opening portion. Even if the hydraulically actuated valve body is not driven by the drive unit, the inflow opening portion is closed by the force received from the fuel in the lower control chamber portion by the communication between the upper control chamber portion and the outflow passage by the unseating of the first control valve body. Therefore, even in the configuration where the valve body for closing the inflow opening portion is added in order to improve the response of the nozzle needle when the valve is closed, the valve body is a hydraulically actuated valve body, and therefore, an increase in the load of the drive unit is less likely to be caused.

In a state in which the hydraulically actuated valve body closes the inflow opening portion, the outflow flow rate of the fuel from the lower control chamber portion to the outflow passage is controlled by the communication passage communicating the upper control chamber portion and the lower control chamber portion. The flow channel area of the communication passage is switched to another by the unseating and seating of the second control valve body driven by the drive unit through the first control valve body from and on the hydraulically actuated valve body. Specifically, when the second control valve body is unseated from the hydraulically actuated valve body, the communication passage is switched from the first throttle state to the second throttle state larger in flow channel area than the first throttle state.

When the first drive energy is input to the drive unit, the first control valve body is unseated from the opening wall, while the second control valve body is maintained in a seated state on the hydraulically actuated valve body. Therefore, the fuel flows out from the lower control chamber portion to the outflow passage through the communication passage in the first throttle state. In addition, the input of the second drive energy, which is greater than the first drive energy, to the drive unit, causes the first control valve body and the second control valve body to be unseated from the opening wall and the hydraulically actuated valve, respectively. Therefore, the fuel flows out from the lower control chamber portion to the outflow passage through the communication passage in the second throttle state having a flow channel area larger than that in the first throttle state. As described above, the valve mechanism can change a manner of the pressure drop in the pressure control chamber by changing the flow channel area of the communication passage by increasing or decreasing the drive energy input to the drive unit. Therefore, the switching of a valve opening speed of the nozzle needle and also an injection rate characteristic can be realized by the control of the drive unit which drives the first control valve body.

Accordingly, the present disclosure enables to provide a fuel injection device capable of switching the injection rate characteristic and improving the response of injection while reducing an increase in the number of drive units and the load.

Hereinafter, a plurality of embodiments of the present disclosure will be described with reference to the drawings. The same reference numerals are assigned to the corresponding components in each embodiment, and thus, duplicate descriptions may be omitted. When only a part of the configuration is described in each embodiment, the configuration of the other embodiments described above can be applied to other parts of the configuration. Further, not only the combinations of the configurations explicitly shown in the description of the respective embodiments, but also the configurations of the plurality of embodiments can be partially combined even if the configurations are not explicitly shown if there is no problem in the combination in particular. Unspecified combinations of the configurations described in the plurality of embodiments and the modification examples are also disclosed in the following description.

First Embodiment

A fuel injection device 10 according to a first embodiment of the present disclosure is used in a fuel supply system 1 shown in FIG. 1. The fuel injection device 10 supplies a fuel stored in a fuel tank 4 to each combustion chamber 2b of a diesel engine, which is an internal combustion engine. The fuel supply system 1 includes a feed pump 5, a high-pressure fuel pump 6, a common rail 3, a control device 7, and the like together with the fuel injection device 10. In the present embodiment, the diesel engine is referred to as an engine 2.

The feed pump 5 is, for example, a trochoid type electric pump. The feed pump 5 is built in the high-pressure fuel pump 6. The feed pump 5 pumps a light oil as the fuel stored in the fuel tank 4 to the high-pressure fuel pump 6. The feed pump 5 may be provided separately from the high-pressure fuel pump 6, and may be disposed inside the fuel tank 4, for example.

The high-pressure fuel pump 6 is, for example, a plunger type pump. The high-pressure fuel pump 6 is driven by an output shaft of the engine 2. The high-pressure fuel pump 6 is connected to a common rail 3 by a fuel pipe 6a. The high-pressure fuel pump 6 further boosts a pressure of the fuel supplied by the feed pump 5, and supplies the boosted fuel as a high-pressure fuel to the common rail 3.

The common rail 3 is connected to a plurality of fuel injection devices 10 through a high-pressure fuel pipe 3b. The common rail 3 is connected to the fuel tank 4 through an excess fuel pipe 8a. The common rail 3 temporarily stores the high-pressure fuel supplied from the high-pressure fuel pump 6, and distributes the high-pressure fuel to each of the fuel injection devices 10 while maintaining the pressure. The common rail 3 is provided with a pressure sensor 3a and a pressure reducing valve 8. The pressure sensor 3a detects the fuel pressure stored in the common rail 3. The pressure reducing valve 8 discharges the surplus fuel to the excess fuel pipe 8a when a detection value by the pressure sensor 3a is higher than a target pressure.

The control device 7 includes an arithmetic circuit mainly including a microcomputer or a microcontroller. The arithmetic circuit includes a processor, a RAM, and a rewritable nonvolatile memory device. The control device 7 is electrically connected to each of the fuel injection devices 10 (refer to broken lines in FIG. 1). The control device 7 controls the operation of each fuel injection device 10 in accordance with an operating state of the engine 2.

The fuel injection device 10 is attached to a head member 2a in a state of being inserted into an insertion hole of the head member 2a forming the combustion chamber 2b. The fuel injection device 10 directly injects the high-pressure fuel supplied through the high-pressure fuel pipe 3b from injection holes 23 toward the combustion chamber 2b. The fuel injection device 10 has a valve structure for controlling the injection of the fuel from the injection holes 23. The fuel injection device 10 uses a part of the high-pressure fuel to open and close the injection holes 23. Part of the fuel supplied to the fuel injection device 10 passes through a return pipe 8b and is returned from the excess fuel pipe 8a to the fuel tank 4.

Figure 2:
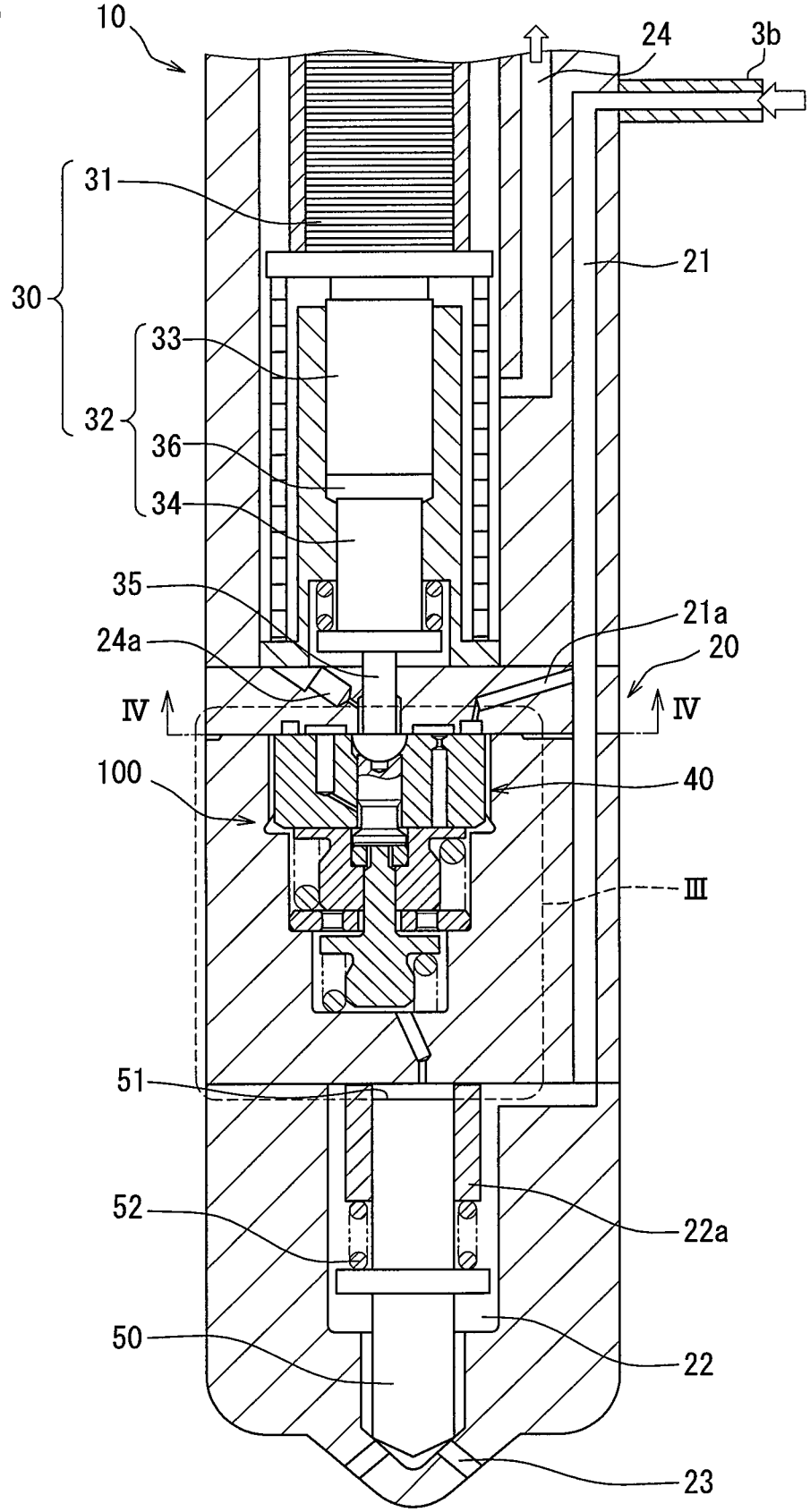
FIG. 2 is a vertical cross-sectional view of the fuel injection device.

As shown in FIGS. 2 and 1, the fuel injection device 10 includes a valve body 20, a nozzle needle 50, a drive unit 30, and a valve mechanism 100.

The valve body 20 is formed by combining multiple members made of a metal material together. A high-pressure passage 21, a low-pressure passage 24, a pressure control chamber 40, an inflow passage 21a, an outflow passage 24a, the injection holes 23, and a needle chamber 22 are defined in the valve body 20.

The high-pressure passage 21 is connected to a high-pressure fuel pipe 3b (refer to FIG. 1). The high-pressure passage 21 supplies the high-pressure fuel supplied from the common rail 3 through the high-pressure fuel pipe 3b to the needle chamber 22. The low-pressure passage 24 is a passage through which the fuel supplied to the fuel injection device 10 flows out to the return pipe 8b (refer to FIG. 1). The fuel flowing through the low-pressure passage 24 has a lower pressure than that of the fuel flowing through the high-pressure passage 21.

The pressure control chamber 40 is filled with a high-pressure fuel. The pressure control chamber 40 is provided inside the valve body 20 on a side opposite to the injection holes 23 across a nozzle needle 50. The pressure control chamber 40 is defined between the drive unit 30 and the needle chamber 22.

The inflow passage 21a branches from the high-pressure passage 21. The inflow passage 21a allows a part of the high-pressure fuel flowing through the high-pressure passage 21 to flow into the pressure control chamber 40. The outflow passage 24a allows the fuel in the pressure control chamber 40 to outflow to the low-pressure passage 24.

The injection holes 23 are defined at a tip portion of the valve body 20 inserted into the head member 2a in an insertion direction. The injection holes 23 are exposed to the combustion chamber 2b. The tip portion of the valve body 20 is conical or hemispherical. The multiple injection holes 23 are provided radially from the inside to the outside of the valve body 20. The high-pressure fuel is injected from each injection hole 23 toward the combustion chamber 2b. The high-pressure fuel is atomized by passing through the injection holes 23, and is easily mixed with air.

The needle chamber 22 is a space defined in a columnar shape inside the valve body 20. The nozzle needle 50 is accommodated in the needle chamber 22. The needle chamber 22 is connected to the high-pressure passage 21. The needle chamber 22 is filled with high-pressure fuel supplied through the high-pressure passage 21. The needle chamber 22 is provided with a needle wall 22a formed in a cylindrical shape.

The nozzle needle 50 is made of a metal material and formed in a cylindrical shape. A tip of the nozzle needle 50 on the injection holes 23 side is formed in a conical shape. The nozzle needle 50 is slidably held on the needle wall 22a in the needle chamber 22. A force in the valve opening direction is applied to the nozzle needle 50 from the high-pressure fuel in the needle chamber 22. The nozzle needle 50 is provided with a pressure receiving surface 51 and a needle spring 52. The pressure receiving surface 51 is an end face of the nozzle needle 50 facing the pressure control chamber 40 on a radially inner side of the needle wall 22a. A force in the valve closing direction from the fuel in the pressure control chamber 40 acts on the pressure receiving surface 51. The needle spring 52 is a coil spring that applies a force in the valve closing direction to the nozzle needle 50. The nozzle needle 50 is displaced relative to the valve body 20 by a variation in the fuel pressure of the pressure control chamber 40, thereby opening and closing the injection holes 23. When the nozzle needle 50 is opened to open the injection hole 23, the high-pressure fuel filled in the needle chamber 22 is injected from the injection holes 23 toward the combustion chamber 2b (refer to FIG. 1).

The drive unit 30 drives the valve mechanism 100. The drive unit 30 includes a piezoelectric actuator 31, a transmission mechanism 32, and the like. The piezoelectric actuator 31 has a laminate in which layers formed of piezoelectric elements and thin electrode layers are alternately stacked on each other. A drive voltage, which is a voltage corresponding to a drive signal generated by the control device 7, is input to the piezoelectric actuator 31. The piezoelectric actuator 31 extends by a reverse voltage effect which is a characteristic of the piezoelectric element in accordance with the drive energy input by a drive voltage. The drive energy input to the piezoelectric actuator 31 is increased or decreased by the control of the control device 7. As the applied drive energy increases, the extension amount of the piezoelectric actuator 31 increases.

The transmission mechanism 32 is a mechanism for transmitting the extension of the piezoelectric actuator 31 to the valve mechanism 100. The transmission mechanism 32 includes a first piston 33 and a second piston 34. The first piston 33 and the second piston 34 are formed in a columnar shape. The second piston 34 has a smaller diameter than that of the first piston 33. A transmission portion 35 is formed in the second piston 34. An oil-tight chamber 36 is defined between the first piston 33 and the second piston 34. The oil-tight chamber 36 is filled with fuel in a substantially oil-tight manner.

The drive unit 30 displaces the first piston 33 toward the oil-tight chamber 36 by the piezoelectric actuator 31 extended by the input of the drive energy. The movement of the first piston 33 is enlarged by the fuel in the oil-tight chamber 36 and transmitted to the second piston 34. The amount of displacement of the second piston 34 is larger than the amount of displacement of the first piston 33. The movement of the second piston 34 is transmitted from the transmission portion 35 to the valve mechanism 100.

Figure 3:
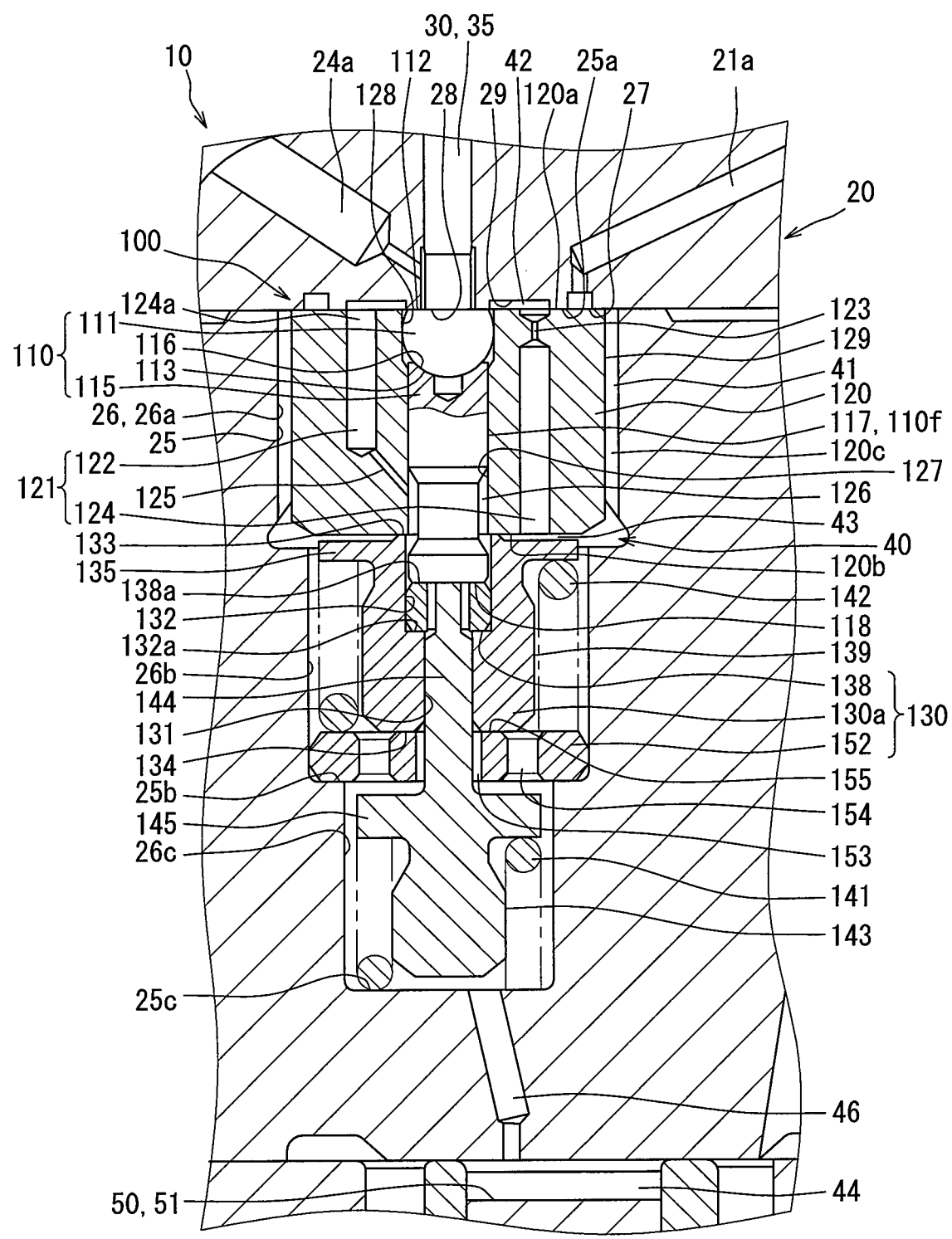
FIG. 3 is an enlarged view of a region III of FIG. 2, showing a detailed configuration of a valve mechanism.
Figure 4:
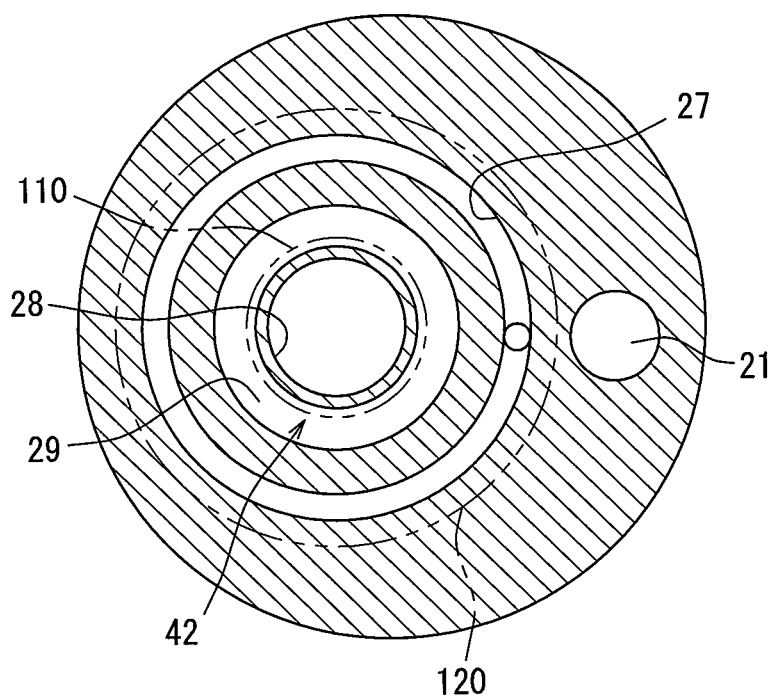
FIG. 4 is a cross-sectional view taken along a line IV-IV of FIG. 2, showing a positional relationship between an outflow opening portion and an inflow opening portion that open to an opening wall.

The valve mechanism 100 shown in FIGS. 2 to 4 is accommodated in the pressure control chamber 40. The pressure control chamber 40 is provided with a valve body accommodation space 41, a pressure acting space 44, a pressure control communication passage 46, and the like. The valve mechanism 100 includes a first control valve body 110, a hydraulically actuated valve body 120, a second control valve body 130, an intermediate member 143, a first urging member 141, a second urging member 142, and the like. The respective components of the valve mechanism 100 are disposed so as to be coaxial with each other.

The valve body accommodation space 41 is a space partitioned into a multi-step (three-step) columnar shape as a whole. In a partition wall 25 formed in the valve body 20, an opening wall 25*a*, an inner peripheral wall 26, a step wall 25*b*, and a placement wall 25*c* face the valve body accommodation space 41. The opening wall 25*a* is one wall surface of the partition wall 25 located at a position closest to the drive unit 30. The opening wall 25*a* is formed in a planar shape facing the injection hole side. An outflow opening portion 28 of the outflow passage 24*a* and an inflow opening portion 27 of the inflow passage 21*a* are opened in the opening wall 25*a*. The outflow opening portion 28 is formed in a circular shape. The inflow opening portion 27 is a toric groove portion defined to surround the outflow opening portion 28. A toric recess 29 shallower than the inflow opening portion 27 is defined in the opening wall 25*a* between the outflow opening portion 28 and the inflow opening portion 27. An axial direction of the valve body accommodation space 41 extends along the respective axial directions of the inflow opening portion 27 and the outflow opening portion 28, and is substantially orthogonal to the opening wall 25*a*.

An inner peripheral wall 26 has a first wall portion 26*a*, a second wall portion 26*b*, and a third wall portion 26*c*. Each of the wall portions 26*a*, 26*b*, and 26*c* is a cylindrical wall having different inner diameters, and is formed so as to be substantially coaxial with each other. An inner diameter of the first wall portion 26*a* is larger than an inner diameter of the second wall portion 26*b*. An inner diameter of the second wall portion 26*b* is larger than an inner diameter of the third wall portion 26*c*. The second wall portion 26*b* is formed closer to the injection hole than the first wall portion 26*a* in the axial direction of the valve body accommodation space 41. The third wall portion 26*c* is formed closer to the injection hole than the second wall portion 26*b* in the axial direction of the valve body accommodation space 41.

The step wall 25*b* and the placement wall 25*c* face the opening wall 25*a* in the axial direction of the valve body accommodation space 41. The step wall 25*b* is a toric plane formed between the first wall portion 26*a* and the second wall portion 26*b*. The placement wall 25*c* is a circular plane formed on the opposite side of the opening wall 25*a* across the step wall 25*b*. One end of the pressure control communication passage 46 facing the valve body accommodation space 41 is opened in the placement wall 25*c*.

The valve body accommodation space 41 is divided into an upper control chamber portion 42 and a lower control chamber portion 43 by the valve mechanism 100. The upper control chamber portion 42 is defined mainly between the valve mechanism 100 and the opening wall 25*a* in the axial direction of the valve body accommodation space 41. An outflow opening portion 28 faces the upper control chamber portion 42. The upper control chamber portion 42 is formed on the inner peripheral side of the inflow opening portion 27 in the radial direction of the valve body accommodation space 41. The lower control chamber portion 43 is located on the opposite side of the upper control chamber portion 42 across the hydraulically actuated valve body 120. The fuel filled in the lower control chamber portion 43 causes a force in the valve closing direction to act on the hydraulically actuated valve body 120.

The pressure acting space 44 is a disc-shaped space partitioned by the needle wall 22*a*, the pressure receiving surface 51, and the like. The pressure acting space 44 is formed on the opposite side of the valve body accommodation space 41 across the pressure control communication passage 46. A volume of the pressure acting space 44 is smaller than a volume of the valve body accommodation space 41. The pressure acting space 44 applies the fuel pressure to the pressure receiving surface 51. As the fuel pressure in the pressure acting space 44 is varied, the nozzle needle 50 is displaced relative to the valve body 20. When the fuel pressure in the pressure acting space 44 drops, the nozzle needle 50 is displaced in the valve opening direction. On the other hand, when the fuel pressure in the pressure acting space 44 is restored, the nozzle needle 50 is displaced in the valve closing direction.

The pressure control communication passage 46 is a fuel passage defined between the valve body accommodation space 41 and the pressure acting space 44. The pressure control communication passage 46 communicates between the valve body accommodation space 41 and the pressure acting space 44. The pressure control communication passage 46 causes the fuel pressure in the pressure acting space 44 to follow the fuel pressure in the valve body accommodation space 41.

The first control valve body 110 opens and closes the outflow opening portion 28 by being unseated from and seated on the opening wall 25*a* by the driving of the drive unit 30. The first control valve body 110 is an unbalanced valve substantially free of static leakage. A part of the first control valve body 110 is accommodated in the upper control chamber portion 42. When the first control valve body 110 is opened, the upper control chamber portion 42 is in communication with the outflow opening portion 28. When the first control valve body 110 is closed, the communication between the upper control chamber portion 42 and the outflow opening portion 28 is cut off. The first control valve body 110 is formed in a columnar shape as a whole. A cylindrical outer peripheral surface 110*f* of the first control valve body 110 is slidably fitted to the hydraulically actuated valve body 120. The first control valve body 110 includes a valve closing member 111 and a fitting member 115 made of a metal material or the like.

A closing portion 112 and a spherical portion 113 are formed in the valve closing member 111. The closing portion 112 is formed in a planar shape and faces the opening wall 25*a*. The valve closing member 111 has a circular shape having a diameter larger than that of the outflow opening portion 28. A transmission portion 35 is in contact with a center of the closing portion 112. When the displacement of the drive unit 30 is transmitted to the valve closing member 111 through the transmission portion 35, the closing portion 112 is unseated from the opening wall 25*a*. The closing portion 112 can close the outflow opening portion 28 by seating on the opening wall 25*a*. The spherical portion 113 is formed in a partial spherical shape continuous with an outer edge of the closing portion 112.

The fitting member 115 is formed in a columnar shape. The fitting member 115 transmits the displacement of the valve closing member 111 driven by the drive unit 30 to the second control valve body 130. The fitting member 115 is formed with a contact portion 116, a fitting portion 117, and an input end face 118. The contact portion 116 is formed on one of both ends of the fitting member 115 in the axial direction, which is closer to the valve closing member 111. The contact portion 116 is formed in a concave spherical shape. The curvature of a curvature of the contact portion 116 is substantially the same as or slightly larger than the curvature of the spherical portion 113. The contact portion 116 is in surface contact with the spherical portion 113. With sliding between the contact portion 116 and the spherical portion 113, the fitting member 115 is allowed to tilt relative to the valve closing member 111.

The fitting portion 117 is formed on the side surface of the fitting member 115. The fitting portion 117 is slidably fitted to the hydraulically actuated valve body 120 while maintaining the liquid-tight state between the upper control chamber portion 42 and the lower control chamber portion 43. The input end face 118 is formed in a planar shape on the side opposite to the contact portion 116 in the axial direction of the fitting member 115. An intermediate member 143 is in contact with the center of the input end face 118. The fitting member 115 transmits a force in the valve closing direction input to the input end face 118 to the valve closing member 111.

The hydraulically actuated valve body 120 is a hydraulically driven valve which is displaced by a pressure difference generated between the upper control chamber portion 42 and the lower control chamber portion 43. The hydraulically actuated valve body 120 is slidable relative to an outer peripheral surface 110f of the first control valve body 110, and is displaceable independently of the first control valve body 110. An axial direction of the hydraulically actuated valve body 120 is along each axial direction of the first control valve body 110 and the first wall portion 26a. The hydraulically actuated valve body 120 is displaced in the axial direction due to a pressure difference between the upper and lower pressures, and is unseated from and seated on the opening wall 25a, thereby opening and closing the inflow opening portion 27.

The hydraulically actuated valve body 120 is made of a metal material or the like and formed in a flat columnar shape as a whole. The hydraulically actuated valve body 120 is accommodated in a space on a radially inner side of the first wall portion 26a in the valve body accommodation space 41. The hydraulically actuated valve body 120 is formed with an upper seating surface 120a, a lower seating surface 120b, a large diameter outer peripheral wall 129, a through hole 126, and multiple (two) communication passages 121. The upper seating surface 120a is an end face of the hydraulically actuated valve body 120 facing the opening wall 25a in the axial direction. The lower seating surface 120b is a circular end face formed on the opposite side of the upper seating surface 120a in the axial direction. The large diameter outer peripheral wall 129 is a side wall of the hydraulically actuated valve body 120 formed in a cylindrical shape. The large diameter outer peripheral wall 129 faces the first wall portion 26a in the radial direction. A cylindrical gap 120c is defined between the large diameter outer peripheral wall 129 and the first wall portion 26a. The gap 120c serves as a flow channel of the high-pressure fuel flowing from the inflow opening portion 27 toward the lower control chamber portion 43.

A through hole 126 is a columnar through hole defined at the center of the hydraulically actuated valve body 120 in the radial direction. The through hole 126 extends along a center axis of the hydraulically actuated valve body 120. The through hole 126 is provided with a fitting hole 127 and an accommodation end portion 128. The fitting hole 127 is fitted to the fitting portion 117, and forms a liquid-tight seal between the upper control chamber portion 42 and the lower control chamber portion 43. The accommodation end portion 128 accommodates the valve closing member 111. The inner diameter of the accommodation end portion 128 is larger than an inner diameter of the fitting hole 127.

The communication passage 121 is a fuel passage for communicating the upper control chamber portion 42 with the lower control chamber portion 43. With the hydraulically actuated valve body 120 closing the inflow opening portion 27, the communication passage 121 controls the outflow flow rate of the fuel from the pressure control chamber 40 to the outflow passage 24a. A first communication passage 122 and a second communication passage 124 are defined in the hydraulically actuated valve body 120 as a communication passage 121. The first communication passage 122 and the second communication passage 124 are defined between the through hole 126 and the large diameter outer peripheral wall 129 in the radial direction. The first communication passage 122 and the second communication passage 124 are formed at positions apart by approximately 180 degrees from each other in the circumferential direction.

The first communication passage 122 penetrates between the upper seating surface 120a and the lower seating surface 120b in the axial direction. A small diameter orifice 123 is defined in the first communication passage 122. The small diameter orifice 123 defines a flow channel area of the first communication passage 122, and controls the flow rate of the fuel flowing through the first communication passage 122. A main hole 124a and a large diameter orifice 125 are defined in the second communication passage 124. The main hole 124a is a cylindrical hole extending along the axial direction, and opens only to the upper seating surface 120a of the upper seating surface 120a and the lower seating surface 120b. The large diameter orifice 125 communicates the main hole 124a with the through hole 126. The large diameter orifice 125 defines a flow channel area of the second communication passage 124, and controls a flow rate of the fuel flowing through the second communication passage 124. A throttle area of the large diameter orifice 125 is larger than a throttle area of the small diameter orifice 123. For that reason, the flow channel area of the first communication passage 122 is narrower than the flow channel area of the second communication passage 124.

The hydraulically actuated valve body 120 closes the inflow opening portion 27 by the force received from the fuel in the lower control chamber portion 43 when the upper control chamber portion 42 and the outflow passage 24a are brought into communication with each other by the unseating of the first control valve body 110 from the opening wall 25a. When the hydraulically actuated valve body 120 is closed, the communication between the inflow opening portion 27 and the pressure control chamber 40 is shut off, and the valve body accommodation space 41 is divided into the upper control chamber portion 42 and the lower control chamber portion 43. The passage section of the first communication passage 122 and the second communication passage 124, which is closer to the upper control chamber portion 42 than the orifices 123 and 125, belongs to the upper control chamber portion 42. Similarly, the space within the accommodation end portion 128 also belongs to the upper control chamber portion 42. Those spaces have substantially the same fuel pressure.

On the other hand, after the first control valve body 110 has been closed, when the pressure difference between the upper and lower sides is reduced by the fuel flow through the communication passage 121, the hydraulically actuated valve body 120 is unseated from the opening wall 25a by the force received from the high-pressure fuel in the inflow passage 21a. When the hydraulically actuated valve body 120 is opened, the inflow opening portion 27 is in communication with the pressure control chamber 40. According to the unseating of the hydraulically actuated valve body 120 from the opening wall 25a, the second control valve body 130 is displaced in the direction away from the first control valve body 110.

The second control valve body 130 is indirectly driven by the drive unit 30 through the first control valve body 110, and consequently is seated on and unseated from the lower seating surface 120b of the hydraulically actuated valve body 120. The second control valve body 130 is aligned in series with the first control valve body 110 along the displacement direction of the first control valve body 110 driven by the drive unit 30. The second control valve body 130 switches the flow channel area of the communication passage 121 by unseating from and seating on the lower seating surface 120b. When the second control valve body 130 is unseated from the lower seating surface 120b, the flow channel area of the communication passage 121 increases.

The second control valve body 130 includes a valve main body 130a, a first lift adjustment shim 138, a second lift adjustment shim 152, and the like. The valve main body 130a is made of a metal material or the like, and is formed in a flat columnar shape as a whole. The valve main body 130a is formed with a small diameter outer peripheral wall 139, an insertion hole 131, a shim accommodation hole 132, a seat surface 133, an abutment surface 134, and a flange portion 135.

The small diameter outer peripheral wall 139 is a side wall of the valve main body 130a formed in a cylindrical shape. The small diameter outer peripheral wall 139 faces the second wall portion 26b in the radial direction. An outer diameter of the small diameter outer peripheral wall 139 is smaller than an outer diameter of the large diameter outer peripheral wall 129. The insertion hole 131 and the shim accommodation hole 132 form a single through hole in a columnar shape at the center in the radial direction of the valve main body 130a. The through hole extends along the center axis of the valve main body 130a. An inner diameter of the insertion hole 131 is smaller than an inner diameter of the shim accommodation hole 132. A step surface 132a facing the input end face 118 is formed between the insertion hole 131 and the shim accommodation hole 132. An intermediate member 143 is inserted through the insertion hole 131. The shim accommodation hole 132 is provided on the side of the hydraulically actuated valve body 120 with respect to the insertion hole 131.

The seat surface 133 is formed in a toric shape so as to surround the opening of the shim accommodation hole 132. The seat surface 133 protrudes convexly from an end face of the valve main body 130a facing the lower seating surface 120b. An inner diameter of the seat surface 133 is larger than an inner diameter of the through hole 126. The seat surface 133 shuts off the flow of the fuel from the outer peripheral side to the inner peripheral side of the seat surface 133 by a contact with the lower seating surface 120b. The abutment surface 134 can be unseated from and seated on the second lift adjustment shim 152. The flange portion 135 is a toric portion protruding from the small diameter outer peripheral wall 139 to an outer peripheral side. One end of the second urging member 142 is mounted on the flange portion 135.

The first lift adjustment shim 138 is made of a metal material and formed in a cylindrical shape. The first lift adjusting shim 138 is accommodated in the shim accommodation hole 132 in a posture in which an axial direction of the first lift adjustment shim 138 is aligned with the axial direction of the valve main body 130a, and abuts against the step surface 132a. The first lift adjustment shim 138 is disposed between the input end face 118 and the step surface 132a, and the contact end surface 138a faces the input end face 118. When the first control valve body 110 is closed, a first gap, which is a gap, is defined between the contact end surface 138a and the input end face 118. When the first gap is eliminated due to the displacement of the first control valve body 110, the second control valve body 130 is pushed by the first control valve body 110 and displaced in the valve opening direction. The dimension of the first gap is, for example, about 10 to 20 μm. The dimension of the first gap is adjusted by changing an axial length of the first lift adjustment shim 138, for example, during manufacture of the fuel injection device 10.

The second lift adjustment shim 152 is made of a metal material and formed in a disc shape. The second lift adjustment shim 152 is accommodated in a radially inner side of the second wall portion 26b in a posture in which the axial direction of the second lift adjustment shim 152 is aligned with the axial direction of the valve main body 130a, and abuts against the step wall 25b. The second lift adjustment shim 152 is disposed between the valve body 130a and the step surface 132a, and the upper shim surface 155 faces the abutment surface 134 at a lower end of the valve main body 130a. When both the hydraulically actuated valve body 120 and the second control valve body 130 are closed, a second gap, which is a gap, is defined between the upper shim surface 155 and the abutment surface 134. The second gap defines a maximum displacement amount (lift amount) of the second control valve body 130. A dimension of the second gap is, for example, about 10 to 20 μm, similarly to the dimension of the first gap. The dimension of the second gap is adjusted by changing a thickness of the second lift adjustment shim 152, for example, during manufacture of the fuel injection device 10.

The second lift adjustment shim 152 is formed with an insertion hole 153 and multiple flow holes 154 as through holes passing through the second lift adjustment shim 152 in the axial direction. The insertion hole 153 is located at the center of the second lift adjustment shim 152 in the radial direction. The insertion hole 153 penetrates through the intermediate member 143. The flow holes 154 are defined in the outer peripheral side of the insertion hole 153 at intervals from each other. The fuel flows through the flow holes 154.

The second control valve body 130 described above switches the state of the communication passage 121 from the first throttle state to the second throttle state by being unseated from the hydraulically actuated valve body 120. Specifically, in the first throttle state, the second control valve body 130 seats the seat surface 133 on the lower seating surface 120b. Even in this state, the first communication passage 122 communicates the upper control chamber portion 42 and the lower control chamber portion 43 to each other. On the other hand, the fuel cannot flow through the second communication passage 124.

On the other hand, in the second throttle state, the fuel is allowed to flow into the through hole 126 and the large diameter orifice 125 by the unseating of the seat surface 133 from the lower seating surface 120b. As a result, the second communication passage 124 communicates the upper control chamber portion 42 with the lower control chamber portion 43. As described above, in the first throttle state, only the first communication passage 122 of the two communication passages 121 is in the communication state, so that the flow channel area is reduced. On the other hand, in the second throttle state, since both the first communication passage 122 and the second communication passage 124 are put into the communication state, the flow channel area is ensured to be larger than that in the first throttle state.

The intermediate member 143 and the first urging member 141 are accommodated in a space on a radially inner side of the third wall portion 26c in the valve body accommodation space 41. The intermediate member 143 has a rod portion 144 and a flange portion 145. The rod portion 144 protrudes from the main body portion of the intermediate member 143 in a columnar shape toward the fitting member 115. The rod portion 144 is inserted into the insertion hole 153 of the second lift adjustment shim 152 and the insertion hole 131 of the second control valve body 130. A tip of the rod portion 144 is pressed against the input end face 118. The flange portion 145 is a toric portion protruding from the main body portion of the intermediate member 143 toward the outer peripheral side. One end of the first urging member 141 in the axial direction abuts on the flange portion 145.

The first urging member 141 is a coil spring formed in a cylindrical spiral shape. The first urging member 141 is disposed on the lower control chamber portion 43 side with respect to the hydraulically actuated valve body 120. The first urging member 141 is accommodated in a space other than the upper control chamber portion 42 in the pressure control chamber 40. The first urging member 141 is disposed between the flange portion 145 and the placement wall 25c in a state of being compressed in the axial direction. A columnar main body portion of the intermediate member 143 is accommodated in the inner peripheral side of the first urging member 141. The first urging member 141 acts a restoring force urging the first control valve body 110 in the valve closing direction on the flange portion 135. The intermediate member 143 transmits a restoring force acting from the first urging member 141 accommodated in a space other than the upper control chamber portion 42 to the first control valve body 110 at least partially accommodated in the upper control chamber portion 42, and urges the first control valve body 110 in the valve closing direction.

The second urging member 142 is a coil spring formed in a cylindrical spiral shape having a diameter larger than that of the first urging member 141. A spring constant of the second urging member 142 is larger than a spring constant of the first urging member 141. The second urging member 142 is disposed between the flange portion 135 and the second lift adjustment shim 152 in a state of being compressed in the axial direction. The second control valve body 130 is accommodated in the inner peripheral side of the second urging member 142. The second urging member 142 acts a restoring force for urging the second control valve body 130 toward the lower seating surface 120b on the flange portion 135. The second urging member 142 urges the hydraulically actuated valve body 120 in the direction of closing the inflow opening portion 27 through the second control valve body 130.

Next, the operation of the fuel injection device 10 will be described with reference to FIGS. 3 and 5 to 7. The fuel injection device 10 can be actuated in at least three valve opening modes as an example. The valve opening mode of the fuel injection device 10 includes a low-speed valve opening mode, a high-speed valve opening mode, and a switching valve opening mode having different injection rate characteristics from each other.

The low-speed valve opening mode is a valve opening mode in which fuel injection with a low injection rate is performed. The first drive energy supplied in the low-speed valve opening mode is not less than the drive energy that causes the transmission portion 35 to generate a displacement capable of unseating the first control valve body 110 and less than the drive energy that causes the second control valve body 130 to be unseated from the hydraulically actuated valve body 120. The operation of the fuel injection device 10 in the low-speed valve opening mode will be described below with reference to FIG. 5 and with reference to FIG. 3.

Before a time t1 at which the piezoelectric actuator 31 is energized, the valve mechanism 100 closes both the inflow opening portion 27 and the outflow opening portion 28 by the fuel in the lower control chamber portion 43 and the force in the valve closing direction received from each of the urging members 141 and 142.

At the time t1, the first drive energy is input to the piezoelectric actuator 31. The drive unit 30 extends the piezoelectric actuator 31 to displace the first control valve body 110 in the valve opening direction of being unseated from the opening wall 25a. As a result, the outflow opening portion 28 and the upper control chamber portion 42 are brought into communication with each other, and the fuel in the upper control chamber portion 42 flows out of the outflow passage 24a through the outflow opening portion 28. When the fuel pressure of the upper control chamber portion 42 drops in this manner, the hydraulically actuated valve body 120 is pressed against the opening wall 25a by the fuel pressure of the lower control chamber portion 43, and closes the inflow opening portion 27. Therefore, dynamic leakage of the high-pressure fuel is minimized.

As described above, in the low-speed valve opening mode, the first drive energy input to the piezoelectric actuator 31 is kept low. For that reason, the first control valve body 110 is driven by the transmission portion 35 to be unseated from the opening wall 25a and rests in a state in which the input end face 118 is pressed against the contact end surface 138a. On the other hand, the seated state of the second control valve body 130 with respect to the hydraulically actuated valve body 120 is maintained. Therefore, in the communication passage 121, only the first communication passage 122 of the first communication passage 122 and the second communication passage 124 is put into a first throttle state in which the lower control chamber portion 43 and the upper control chamber portion 42 are communicated with each other.

As described above, in the state in which the hydraulically actuated valve body 120 closes the inflow opening portion 27, the outflow flow rate of the fuel from the lower control chamber portion 43 to the outflow passage 24a is controlled by the communication passage 121. Therefore, in the low-speed valve opening mode, the fuel outflow from the lower control chamber portion 43 to the outflow passage 24a is controlled by the small-diameter orifice 123. For that reason, a pressure reduction of the lower control chamber portion 43 becomes lower than a pressure reduction of the upper control chamber portion 42. The resulting pressure difference between the lower control chamber portion 43 and the upper control chamber portion 42 causes the hydraulically actuated valve body 120 to be pressed more strongly against the opening wall 25a to maintain a valve closed state of the inflow opening portion 27.

The fuel pressure in the pressure acting space 44 decreases in accordance with the fuel pressure in the lower control chamber portion 43. When the fuel pressure in the lower control chamber portion 43 and the pressure acting space 44 drops to a predetermined pressure at a time t2, a force for pushing the nozzle needle 50 in the valve opening direction becomes larger than a force for pushing the nozzle needle 50 in the valve closing direction. As a result, the nozzle needle 50 starts to be displaced in the valve opening direction. With the above processing, fuel injection from the injection hole 23 into the combustion chamber 2b (refer to FIG. 1) is initiated. A valve opening (lift) speed of the nozzle needle 50 in the low-speed valve opening mode is lower than that in the high-speed valve opening mode because the fuel flow through the second communication passage 124 is not permitted.

When the energization of the piezoelectric actuator 31 is stopped, the piezoelectric actuator 31 contracts due to the release of the drive energy. As a result, the first control valve body 110 receives the fuel pressure of the lower control chamber portion 43 and a pressing force of the intermediate member 143 urged by the first urging member 141, and starts the displacement toward the opening wall 25a. At a time t3, the first control valve body 110 closes the outflow opening portion 28.

After the time t3, the pressure difference between the upper control chamber portion 42 and the lower control chamber portion 43 is reduced or eliminated by the flow of the fuel through the first communication passage 122. Then, at a time t4, the hydraulically actuated valve body 120 is displaced in the valve opening direction together with the second control valve body 130 by the force in the valve opening direction received from the high-pressure fuel in the inflow opening portion 27, and is unseated from the opening wall 25a. As a result, the inflow of the high-pressure fuel from the inflow opening portion 27 into the pressure control chamber 40 is started.

The high-pressure fuel that has started to flow into the pressure control chamber 40 at the time t4 flows through the predetermined gap 120c, the pressure control communication passage 46, and the like, and flows into the pressure acting space 44. As a result, the pressure in the pressure acting space 44 recovers, and the pressure acting from the pressure acting space 44 to the pressure receiving surface 51 rises. As a result, at a time t5, the nozzle needle 50 stops the displacement in the valve opening direction and starts the displacement in the valve closing direction. At time a t6, the nozzle needle 50 closes the injection holes 23.

Since the inflow of the high-pressure fuel is continued even after the injection hole 23 is closed by the nozzle needle 50, the fuel pressure in the pressure control chamber 40 becomes substantially the same pressure as the high-pressure fuel in the inflow passage 21a at a time t7. For that reason, the hydraulically actuated valve body 120 starts to be displaced together with the second control valve body 130 in the valve closing direction by the urging force of the second urging member 142. At a time t8, the hydraulically actuated valve body 120 is seated on the opening wall 25a and closes the inflow opening portion 27.

The high-speed valve opening mode is a valve opening mode in which fuel injection with an injection rate higher than that of the low-speed valve opening mode is performed. The second drive energy input to the piezoelectric actuator 31 in the high-speed valve opening mode is larger than the first drive energy, and is a drive energy capable of unseating the second control valve body 130 from the hydraulically actuated valve body 120. The actuation of the fuel injection device 10 in the high-speed valve opening mode will now be described with reference to FIG. 6 and with reference to FIG. 3. In the valve mechanism 100 before the time t1, the inflow opening portion 27 and the outflow opening portion 28 are both in the closed state similarly to the low-speed valve opening mode.

At the time t1, the second drive energy is input to the piezoelectric actuator 31. The drive unit 30 displaces the first control valve body 110 in the valve opening direction by the extension of the piezoelectric actuator 31, and unseats the second control valve body 130 from the lower seating surface 120b of the hydraulically actuated valve body 120 through the first control valve body 110. As a result, the outflow opening portion 28 and the upper control chamber portion 42 are brought into communication with each other, and the hydraulically actuated valve body 120 is pressed against the opening wall 25a by the pressure reduction of the upper control chamber portion 42.

As described above, the flow channel area of the communication passage 121 is switched by unseating and seating of the second control valve body 130 from and on the hydraulically actuated valve body 120. When the second control valve body 130 is unseated from the upper seating surface 120a, the communication passage 121 is put into a second throttled state in which both the first communication passage 122 and the second communication passage 124 communicate with the lower control chamber portion 43 and the upper control chamber portion 42. As a result, the fuel outflow from the lower control chamber portion 43 to the outflow passage 24a is controlled by both the small diameter orifice 123 and the large diameter orifice 125. Therefore, the pressure reduction of the lower control chamber portion 43 in the high-speed valve opening mode occurs at a high speed as compared with the low-speed valve opening mode.

At the time t2, when the fuel pressure in the lower control chamber portion 43 and the pressure acting space 44 drops to a predetermined pressure, the nozzle needle 50 starts to be displaced in the valve opening direction. A time from the time t1 to the time t2 in the high-speed valve opening mode is shorter than a time from the time t1 to the time t2 in the low-speed valve opening mode. In addition, since the outflow amount of the fuel from the lower control chamber portion 43 to the outflow passage 24a increases, the nozzle needle 50 can be displaced in the valve opening direction at a higher speed than that in the low-speed valve opening mode.

After the energization of the piezoelectric actuator 31 has been stopped, the first control valve body 110 and the second control valve body 130 are pushed by the fuel pressure of the lower control chamber portion 43, and the urging members 141, 142 and the intermediate member 143, and start to be displaced in the valve closing direction. The second control valve body 130 is seated on the lower seating surface 120b. Similarly, the first control valve body 110 is seated on the opening wall 25a at the time t3, and closes the outflow opening portion 28.

The closing of the outflow opening portion 28 at the time t3 reduces or eliminates the pressure difference between the upper control chamber portion 42 and the lower control chamber portion 43. As a result, at the time t4, the hydraulically actuated valve body 120 is displaced in the valve opening direction together with the second control valve body 130 by the force in the valve opening direction received from the high-pressure fuel in the inflow opening portion 27, and is unseated from the opening wall 25a. As described above, the inflow of the high-pressure fuel from the inflow opening portion 27 into the pressure control chamber 40 is started.

The inflow of the high-pressure fuel into the pressure control chamber 40 started at the time t4 restores the pressure in the pressure acting space 44. In this way, the pressure acting on the pressure receiving surface 51 from the pressure acting space 44 rises. Then, the nozzle needle 50 stops the displacement in the valve opening direction at the time t5, starts the displacement in the valve closing direction, and closes the injection holes 23 at the time t6. After the time t6, similarly to the case of the low-speed valve opening mode, the inflow opening portion 27 is closed by closing the valve of the hydraulically actuated valve body 120.

In the switching valve opening mode, the drive energy input to the piezoelectric actuator 31 is increased or decreased in the middle of one injection. The switching valve opening mode is assumed to be an valve opening mode that is switched from the low-speed valve opening mode to the high-speed valve opening mode, and an valve opening mode that is switched from the high-speed valve opening mode to the low-speed valve opening mode. Hereinafter, the operation of the fuel injection device 10 in the switching valve opening mode in which the low-speed valve opening mode is switched to the high-speed valve opening mode will be described with reference to FIG. 3 with reference to FIG. 7.

Before the time t1, the valve mechanism 100 closes both the inflow opening portion 27 and the outflow opening portion 28 in the same manner as the low-speed valve opening mode and the high-speed valve opening mode. After the time t3, the valve mechanism 100 closes both the first control valve body 110 and the second control valve body 130, and then opens the hydraulically actuated valve body 120 to close the nozzle needle 50, similarly to the high-speed valve opening mode.

At the time t1, the first drive energy is input to the piezoelectric actuator 31, as a result of which the first control valve body 110 is displaced in the valve opening direction. At this time, the seated state of the second control valve body 130 on the hydraulically actuated valve body 120 is maintained. Therefore, similarly to the low-speed valve opening mode, the communication passage 121 is put into the first throttle state. When the fuel pressure in the lower control chamber portion 43 and the pressure acting space 44 drops to the predetermined pressure at the time t2 due to the fuel outflow from the lower control chamber portion 43 to the outflow passage 24a through the small diameter orifice 123, the nozzle needle 50 starts to be displaced in the valve opening direction. Since the outflow flow rate of the fuel is controlled only by the small diameter orifice 123, a valve opening speed of the nozzle needle 50 is reduced to a low speed in the initial stage of the valve opening.

At the time tc, the drive energy input to the piezoelectric actuator 31 is switched from the first drive energy to the second drive energy. The drive unit 30 unseats the second control valve body 130 from the lower seating surface 120b of the hydraulically actuated valve body 120 through the first control valve body 110. As a result, the communication passage 121 is switched from the first throttle state to the second throttle state larger in flow channel area than the first throttle state, and allows the fuel to flow through the second communication passage 124. In a latter stage of the valve opening after a time tc, the valve opening speed of the nozzle needle 50 becomes higher than that in the initial stage of the valve opening before the time tc. The fuel outflow through the small diameter orifice 123 and the large diameter orifice 125 is continued until the time t3 when the first control valve body 110 and the second control valve body 130 are both closed.

The valve mechanism 100 according to the first embodiment includes a hydraulically actuated valve body 120 which is unseated from and seated on the opening wall 25a by a pressure difference generated between the upper control chamber portion 42 and the lower control chamber portion 43, and which opens and closes the inflow opening portion 27. Even if the hydraulically actuated valve body 120 is not driven by the drive unit 30, the inflow opening portion 27 can be closed by the force received from the fuel in the lower control chamber portion 43 by the communication between the upper control chamber portion 42 and the outflow passage 24a. Accordingly, even if a valve body is added to close the inflow opening portion 27 to improve the response at the time of closing the valve by the nozzle needle 50, an increase in the load of the drive unit 30 is unlikely to be caused if the valve body is the hydraulically actuated valve body 120.

In addition, when the first drive energy is input to the drive unit 30, the fuel flows out from the lower control chamber portion 43 to the outflow passage 24a through the communication passage 121 in the first throttle state. Further, when the second drive energy larger than the first drive energy is input to the drive unit 30, the fuel flows out from the lower control chamber portion 43 to the outflow passage 24a through the communication passage 121 in the second throttled state in which the flow channel area is enlarged.

As described above, the valve mechanism 100 can change the manner of the pressure drop in the pressure control chamber 40 by changing the flow channel area of the communication passage 121 with an increase or decrease in the drive energy input to the drive unit 30. Therefore, the two-stage switching of the valve opening speed of the nozzle needle 50, and also the switching of the injection rate characteristic, can be realized by the control of the drive unit 30 that drives the first control valve body 110.

This makes it possible to provide the fuel injection device 10 capable of switching the injection rate characteristic and improving the response of the injection while reducing an increase in the number and load of the drive units 30. As a result, the heat generation rate control in the combustion chamber 2b can be performed appropriately in accordance with the load of the engine 2, and consequently, the fuel consumption, the noise, the exhaust, and the like can be improved.

In addition, according to the first embodiment, multiple passages, that is, the first communication passage 122 and the second communication passage 124 are provided in the hydraulically actuated valve body 120, and the number of passages in the communication state is switched, thereby being capable of switching the flow channel area of the communication passage 121. As described above, if the communication passage 121 is provided in the hydraulically actuated valve body 120 having the largest size among the multiple members configuring the valve mechanism 100, a process of providing the communication passage 121 is not difficult.

Further, according to the first embodiment, the flow channel area of the second communication passage 124, which is brought into a communication state by opening the second control valve body 130, is defined to be larger than the flow channel area of the first communication passage 122. According to the above configuration, a change in area due to the switching of the communication passage 121 from the first throttle state to the second throttle state becomes large. For that reason, the injection rate characteristic of the fuel injection device 10 can be clearly switched by the operation of the valve mechanism 100.

Further, as in the first embodiment, since the second control valve body 130 is configured to be seated on the hydraulically actuated valve body 120, the second control valve body 130 is displaced relative to the first control valve body 110 following the hydraulically actuated valve body 120 at the time of displacement of the hydraulically actuated valve body 120. In the valve mechanism 100 having such a configuration, the opening and closing valve of the outflow opening portion 28 and the switching of the communication passage 121 can be both achieved by the control of one drive unit 30.

In addition, according to the first embodiment, the fitting portion 117 slidably fitted to the hydraulically actuated valve body 120 maintains the liquid-tight state between the upper control chamber portion 42 and the lower control chamber portion 43. As described above, if the fuel flow between the first control valve body 110 and the hydraulically actuated valve body 120 is reduced, the pressure difference necessary for the operation of the hydraulically actuated valve body 120 can be reliably generated. The liquid-tight state is a state in which the amount of fuel flowing between the fitting portion 117 and the fitting hole 127 is smaller than the amount of fuel flowing through the small diameter orifice 123.

In the first control valve body 110 of the first embodiment, the valve closing member 111 and the fitting member 115 are brought respectively in contact with the spherical portion 113 and the contact portion 116 each formed in a spherical shape, respectively. Therefore, even if the posture of the fitting member 115 changes due to, for example, the inclination of the hydraulically actuated valve body 120, the valve closing member 111 can rotate relative to the fitting member 115 to maintain the posture in which the closing portion 112 faces the opening wall 25a. According to the above configuration, the first control valve body 110 can close the outflow opening portion 28 by the closing portion 112, thereby being capable of shutting off the communication between the pressure control chamber 40 and the outflow passage 24a.

Further, the first urging member 141 and the second urging member 142 according to the first embodiment are accommodated in the lower control chamber portion 43 of the upper control chamber portion 42 and the lower control chamber portion 43. As described above, if the first urging member 141 and the second urging member 142 are not accommodated in the upper control chamber portion 42, a volume of the upper control chamber portion 42 can be reduced to be sufficiently smaller than that of the configuration in which the urging member is accommodated in the upper control chamber portion 42. As a result, after the first control valve body 110 closes the outflow opening portion 28, the fuel pressure of the upper control chamber portion 42 quickly approaches the fuel pressure of the lower control chamber portion 43. Therefore, a time from the closing of the first control valve body 110 to the opening of the hydraulically actuated valve body 120 (refer to times t3 to t4 in FIG. 5) is shortened. According to such an improvement in the valve opening response of the hydraulically actuated valve body 120, the fuel pressure in the pressure acting space 44 can be quickly increased. Therefore, the valve closing response of the nozzle needle 50 can be improved.

According to the first embodiment, even if the first urging member 141 is disposed in the upper control chamber portion 42, the intermediate member 143 can transmit the urging force of the first urging member 141 to the first control valve body 110. With the configuration described above, the reliability of the valve closing operation of the first control valve body 110 can be enhanced while reducing the volume of the upper control chamber portion 42.

In addition, according to the first embodiment, the second control valve body 130 is accommodated in the inner peripheral side of the second urging member 142. With such an arrangement, the volume of fuel filled in the pressure control chamber 40 can be kept small. For that reason, after the valve of the hydraulically actuated valve body 120 is opened, the fuel pressure in the pressure acting space 44 can be quickly restored. Therefore, the valve closing response of the nozzle needle 50 is more easily improved.

According to the first embodiment, with the configuration in which the valve body accommodation space 41 and the pressure acting space 44 are communicated with each other through the pressure control communication passage 46, the volumes required for the respective spaces are appropriately secured. With the configuration of the pressure control chamber 40 described above, the volume of the fuel filled in the pressure control chamber 40 can be reduced. According to the above configuration, the fuel pressure in the pressure control chamber 40 rapidly drops after the first control valve body 110 is opened, and the fuel pressure in the pressure control chamber 40 quickly recovers after the hydraulically actuated valve body 120 is opened. According to the above configuration, the response of the nozzle needle 50 is more easily improved.

Further, in the first embodiment, the inner diameters of the first wall portion 26a and the second wall portion 26b that define the valve body accommodation space 41 are defined in accordance with the outer diameters of the hydraulically actuated valve body 120 and the second control valve body 130. With the configuration described above, the volume of the fuel filled in the pressure control chamber 40 can be further reduced. As a result, the pressure reduction in the pressure control chamber 40 after the opening of the first control valve body 110 and the pressure recovery in the pressure control chamber 40 after the opening of the hydraulically actuated valve body 120 both occur at high speed. Therefore, the valve opening response and the valve closing response of the nozzle needle 50 can be improved.

In addition, as in the first embodiment, if the volume of the pressure acting space 44 is smaller than the volume of the valve body accommodation space 41, the fuel pressure in the pressure acting space 44 can quickly follow the fuel pressure in the valve body accommodation space 41. Therefore, the controllability of the nozzle needle 50 can be kept high.

According to the first embodiment, the large diameter outer peripheral wall 129 corresponds to a first outer peripheral wall, the small diameter outer peripheral wall 139 corresponds to a second outer peripheral wall, the first urging member 141 corresponds to an urging member, and the second urging member 142 corresponds to a cylindrical member.

Second Embodiment

Figure 8:
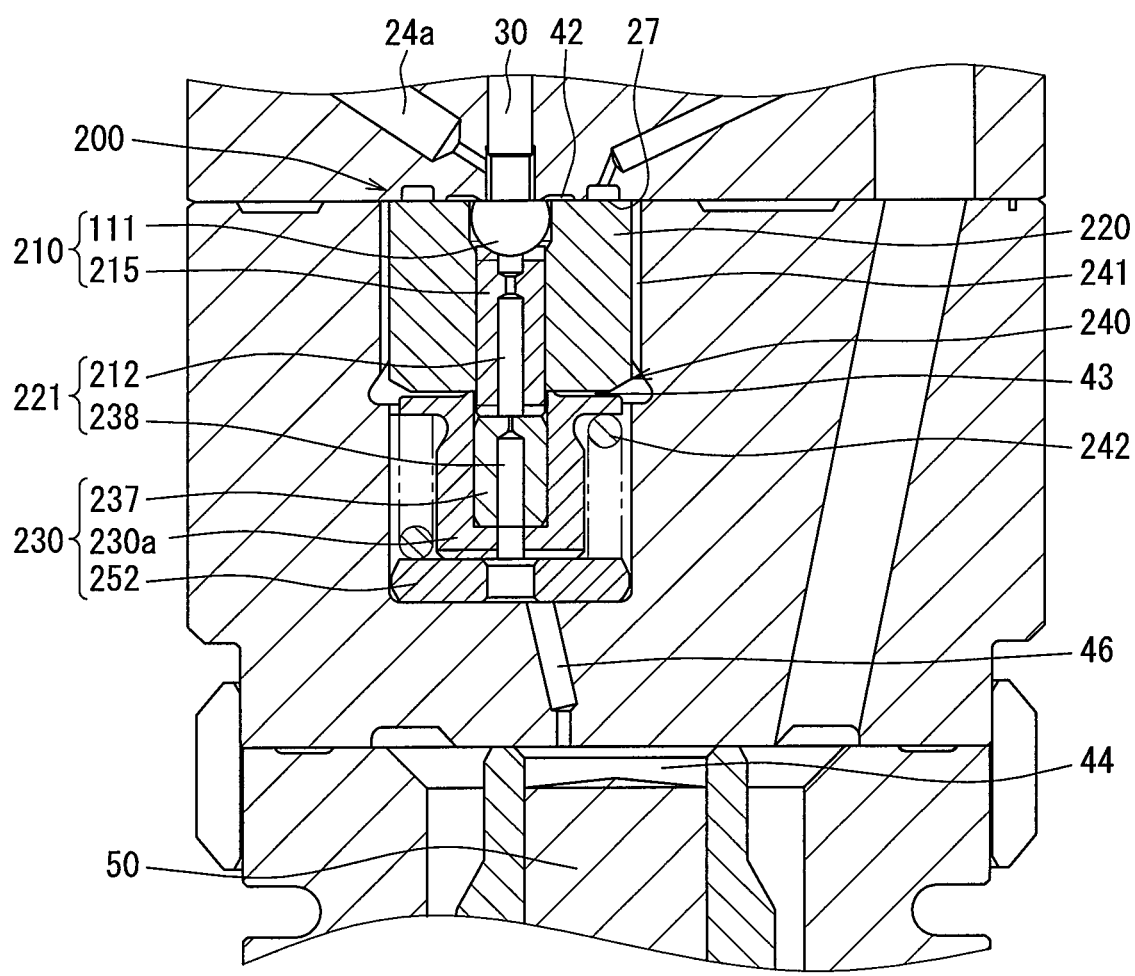
FIG. 8 is a vertical cross-sectional view of a fuel injection device according a second embodiment.
Figure 9:
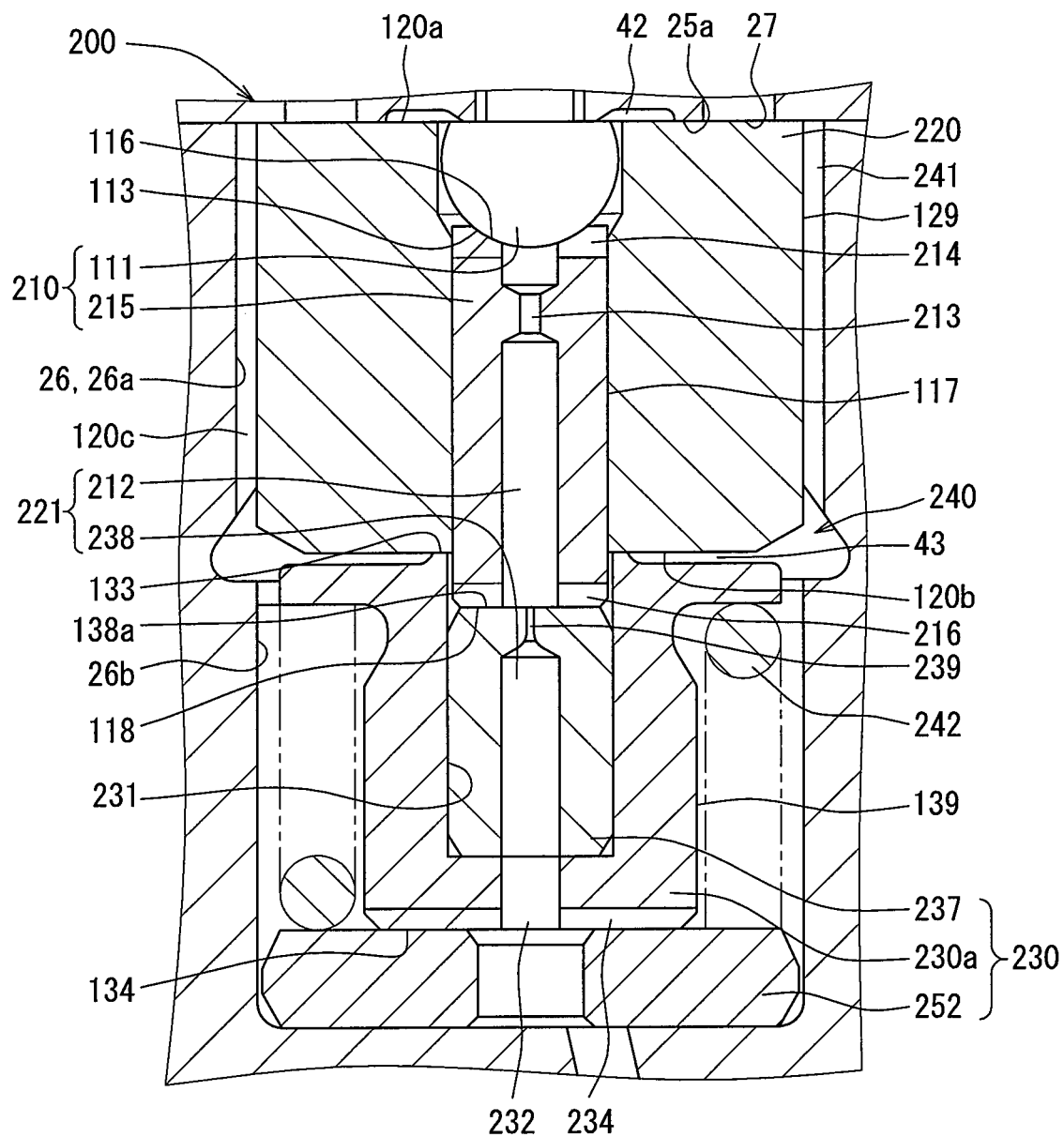
FIG. 9 is an enlarged view showing a detailed configuration of a valve mechanism according to the second embodiment.

A second embodiment shown in FIGS. 8 and 9 is a modification of the first embodiment. In a fuel injection device of the second embodiment, a configuration of a valve mechanism 200 and a shape of a pressure control chamber 240 accommodating the valve mechanism 200 are different from those of the first embodiment. Hereinafter, details of the valve mechanism 200 and the pressure control chamber 240 will be described in order.

The valve mechanism 200 includes a first control valve body 210, a hydraulically actuated valve body 220, a second control valve body 230, and the like, in addition to an urging member 242 which is substantially the same as the second urging member 142 (refer to FIG. 3). The valve mechanism 200 is formed with a communication passage 221 having a configuration different from that of the first embodiment. The respective components of the valve mechanism 200 are assembled so as to be coaxial with each other.

The first control valve body 210 has a configuration corresponding to the first control valve body 110 (refer to FIG. 3) of the first embodiment. The first control valve body 210 includes a valve closing member 111, a fitting member 215, and the like. In the fitting member 215, in addition to the contact portion 116, the fitting portion 117, and the input end face 118, a first passage section 212 of the communication passage 221, an upper outflow port portion 214, and an intermediate inflow port portion 216 are defined.

The first passage section 212 is a through hole that passes through the columnar fitting member 215 in the axial direction. The first passage section 212 is provided at the center of the fitting member 215 in the radial direction. The first passage section 212 opens in the center of each of the contact portion 116 and the input end face 118 in a circular shape. A large diameter orifice 213 is provided in the first passage section 212.

The large diameter orifice 213 is provided in the first passage section 212 at a position closer to the contact portion 116 than the input end face 118. The large diameter orifice 213 is the portion of the first passage section 212 having the narrowest flow channel area. The flow channel area of the first passage section 212 is defined by the large diameter orifice 213.

The upper outflow port portion 214 is a groove portion provided in an upper end face of the fitting member 215 forming the contact portion 116. The upper outflow port portion 214 extends radially from the first passage section 212 to the outer peripheral side. The upper outflow port portion 214 allows the fuel to flow between the first passage section 212 and the upper control chamber portion 42 even when the contact portion 116 and the spherical portion 113 are in contact with each other. The flow channel area of the upper outflow port portion 214 is defined to be larger than the throttle area of the large diameter orifice 213.

The intermediate inflow port portion 216 is a groove portion provided in a lower end surface of the fitting member 215 forming the input end face 118. The intermediate inflow port portion 216 extends radially from the first passage section 212 to the outer peripheral side. The intermediate inflow port portion 216 allows the fuel to flow between the outer peripheral side of the fitting member 215 and the first passage section 212 even when the input end face 118 and the second control valve body 230 are in contact with each other. The flow channel area of the intermediate inflow port portion 216 is defined to be larger than the throttle area of the large diameter orifice 213.

The hydraulically actuated valve body 220 has a configuration corresponding to the hydraulically actuated valve body 120 of the first embodiment (refer to FIG. 3). The hydraulically actuated valve body 220 is formed with an upper seating surface 120a seated on the opening wall 25a and a lower seating surface 120b seated on the second control valve body 230. On the other hand, a fuel passage corresponding to the first communication passage 122 and the second communication passage 124 (refer to FIG. 3) is omitted from the hydraulically actuated valve body 220. For that reason, the large diameter outer peripheral wall 129 of the hydraulically actuated valve body 220 has a smaller diameter than that with the configuration in which the communication passage is formed. As in the first embodiment, the large diameter outer peripheral wall 129 defines a predetermined gap 120c with the first wall portion 26a.

The second control valve body 230 has a configuration corresponding to the second control valve body 130 of the first embodiment (refer to FIG. 3). The second control valve body 230 includes a valve main body 230a, a passage formation member 237, and the like, in addition to a lift adjustment shim 252 corresponding to the second lift adjustment shim 152 (refer to FIG. 3).

In the valve main body 230a, a fitting hole 231, a communication hole 232, and a lower inflow port portion 234 are defined in addition to the small diameter outer peripheral wall 139, the seat surface 133, the abutment surface 134, and the like. The fitting hole 231 and the communication hole 232 provide one through hole at the center of the valve main body 230a in the radial direction in cooperation. The fitting hole 231 and the communication hole 232 are aligned with the valve main body 230a in series with each other in the axial direction so as to be continuous with each other. The fitting hole 231 and the communication hole 232 are cylindrical holes having different inner diameters. An inner diameter of the fitting hole 231 is larger than an inner diameter of the communication hole 232, and is substantially the same as an outer diameter of the passage formation member 237. The fitting hole 231 accommodates a part of the intermediate inflow port portion 216 and the passage formation member 237. The communication hole 232 is a part of the communication passage 221 and opens to the lower control chamber portion 43.

The valve main body 230a defines a second gap substantially the same as that of the first embodiment between the abutment surface 134 and the lift adjustment shim 252 in a state in which the seat surface 133 is seated on the lower seating surface 120b of the hydraulically actuated valve body 220. As the second control valve body 230 is displaced in the valve opening direction, the second gap is eliminated. The second gap defines the maximum lift amount of the second control valve body 230.

The lower inflow port portion 234 is a groove portion provided in a lower end face of the valve main body 230a forming the abutment surface 134. The lower inflow port portion 234 extends radially from the communication hole 232 to the outer peripheral side. The lower inflow port portion 234 allows the fuel to flow between the lower control chamber portion 43 and the communication hole 232 even when the abutment surface 134 and the lift adjustment shim 252 are in contact with each other. The flow channel area of the lower inflow port portion 234 is defined to be larger than the throttle area of the small diameter orifice 239.

The passage formation member 237 is made of a metal material and formed in a cylindrical shape. The passage formation member 237 is accommodated in the fitting hole 231, and is fitted in the inner peripheral wall 26 defining the fitting hole 231. In addition to the contact end face 138a, a second passage section 238 is defined in the passage formation member 237.

The second passage section 238 is a through hole that passes through the passage formation member 237 in the axial direction. The second passage section 238 is provided at the center of the passage formation member 237 in the radial direction. The second passage section 238 is continuous with the communication hole 232. The second passage section 238 is a part of the communication passage 221. The second passage section 238 is aligned in series with the first passage section 212 in the displacement direction in which the drive unit 30 displaces the first control valve body 210. The first passage section 212 and the second passage section 238 are aligned in series with each other to define at least a part of the communication passage 221. A small diameter orifice 239 is defined in the second passage section 238.

The small diameter orifice 239 is provided in the second passage section 238 at a position closer to the contact end face 138a than the communication hole 232. The throttle area of the small diameter orifice 239 is set to be smaller than the throttle area of the large diameter orifice 213. The small diameter orifice 239 defines the flow channel area of the second passage section 238 to be smaller than the flow channel area of the first passage section 212.

The communication passage 221 provided in the valve mechanism 200 described above is a fuel passage that allows the upper control chamber portion 42 and the lower control chamber portion 43 to communicate with each other, similarly to the first embodiment. In the low-speed valve opening mode, in the first throttle state in which the second control valve body 230 is seated on the hydraulically actuated valve body 220, the communication passage 221 connects the first passage section 212 and the second passage section 238. In that case, the fuel in the lower control chamber portion 43 passes through the communication hole 232 from the lower inflow port portion 234, flows through the second passage section 238 and the first passage section 212 in a stated order, and flows out to the upper control chamber portion 42 from the upper outflow port portion 214. As described above, in the first throttle state, the fuel passes through both the small diameter orifice 239 and the large diameter orifice 213. Therefore, the outflow flow rate of the fuel from the lower control chamber portion 43 to the outflow passage 24a is controlled by the small diameter orifice 239 of the second passage section 238.

On the other hand, when the second drive energy is input to the drive unit 30 in the high-speed valve opening mode, the first control valve body 210 pushes the contact end surface 138a by the input end face 118, and unseats the second control valve body 230 from the lower seating surface 120b. As a result, the fuel flow between the seat surface 133 and the lower seating surface 120b is enabled, and the communication passage 221 is put into the second throttle state due to the separation of the second passage section 238 from the first passage section 212. As described above, the fuel in the lower control chamber portion 43 mainly passes between the seat surface 133 and the lower seating surface 120b, flows through the intermediate inflow port portion 216 and the first passage section 212 in a stated order, and flows out from the upper outflow port portion 214 to the upper control chamber portion 42. In this manner, in the second throttle state, the fuel can flow only through the large diameter orifice 213. Therefore, the outflow flow rate of the fuel from the lower control chamber portion 43 to the outflow passage 24a is controlled by the large diameter orifice 213 of the first passage section 212.

The pressure control chamber 240 includes, in addition to the pressure acting space 44 and the pressure control communication passage 46, a valve body accommodation space 241 corresponding to the shape of the valve mechanism 200. The valve body accommodation space 241 is divided into two-step columnar shapes as a whole. The inner peripheral wall 26 defining the valve body accommodation space 241 has a first wall portion 26a and a second wall portion 26b. The first wall portion 26a faces the large diameter outer peripheral wall 129 of the hydraulically actuated valve body 220 in the radial direction. The inner diameter of the first wall portion 26a is defined to be slightly larger than the outer diameter of the large diameter outer peripheral wall 129 of the hydraulically actuated valve body 220. The second wall portion 26b faces the small diameter outer peripheral wall 139 of the second control valve body 230 in the radial direction. The inner diameter of the second wall portion 26b is defined to be slightly smaller than the inner diameter of the first wall portion 26a and slightly larger than the outer diameter of the urging member 242.

Also in the valve mechanism 200 of the second embodiment, the hydraulically actuated valve body 220 may close the inflow opening portion 27.

In addition, the valve mechanism 200 can change the pressure drop of the pressure control chamber 240 by changing the flow channel area of the communication passage 221 by increasing or decreasing the drive energy input to the drive unit 30. According to the above configuration, also in the second embodiment, the same effects as in the first embodiment can be achieved, and the switching of the injection rate characteristic and the improvement of the response of the injection can be made compatible with each other while reducing an increase in the number and load of the drive units 30.

In addition, the communication passage 221 according to the second embodiment is formed not in the hydraulically actuated valve body 220 but in the first control valve body 210 and the second control valve body 230. In this manner, if the provision of the communication passage 221 to the hydraulically actuated valve body 220 is omitted, the outer diameter of the hydraulically actuated valve body 220 can be easily reduced as compared with the configuration in which the communication passage is provided. According to the above configuration, the response of the nozzle needle 50 can be ensured by reducing the volume of the pressure control chamber 240 by reducing the inner diameter of the first wall portion 26a of the valve body accommodation space 241.

If the first passage section 212 and the second passage section 238 are provided in series as in the communication passage 221 of the second embodiment, the connection and separation of the passage sections 212 and 238 are switched by the displacement of the second control valve body 230 through the first control valve body 210. Therefore, if the flow channel areas of the passage sections 212 and 238 are set to mutually different sizes, the flow channel area of the communication passage 221 can be changed by the control of one drive unit 30 without increasing the number of drive units 30.

Further, according to the second embodiment, the first passage section 212 and the second passage section 238 are formed at the respective centers of the first control valve body 210 and the second control valve body 230, and are not eccentric from the respective centers. With the placement described above, it is easy to maintain high accuracy in the formation position of the respective passage section 212 and 238 at the time of processing for forming the respective passage section 212 and 238 in the first control valve body 210 and the second control valve body 230.

In addition, in the first throttle state according to the second embodiment, the small diameter orifice 239 controls the outflow flow rate, and in the second throttling state, the large diameter orifice 213 controls the outflow flow rate. As described above, even when the throttle state is switched, the communication passage 221 controls the outflow flow rate of the fuel at a specific one orifice. If the outflow flow rate is controlled by a plurality of orifices, the variation in the throttle area of each orifice affects the outflow flow rate. Therefore, when the outflow flow rate is controlled by one orifice, the variation in the throttle area is reduced as compared with a configuration in which a plurality of orifices are passed through. Therefore, the communication passage 221 can accurately control the outflow flow rate in each throttle state. According to the second embodiment, the urging member 242 corresponds to a cylindrical member.

Other Embodiments

Although the multiple embodiments have been described above, the present disclosure is not construed as being limited to the embodiments described above, and can be applied to various embodiments and combinations of the embodiments within a scope that does not depart from the spirit of the present disclosure.

The first control valve body of the embodiments described above is stationary in a state of being abutted against the second control valve body in the low-speed valve opening mode. In addition, in the high-speed valve opening mode, the second control valve body rests in a state of being abutted against the lift adjustment shim. However, the first control valve body which is in the valve open state in the low-speed valve opening mode may be stationary in a state of being not abutted on the second control valve body. Similarly, the second control valve body in the valve opening state in the high-speed valve opening mode may be stationary in a state of being not abutted on the lift adjustment shim. The dimensions of the first gap and the second gap may be appropriately changed.

The valve body accommodation space of the embodiments described above is formed in a multi-step columnar shape corresponding to the shape of the valve mechanism. However, the shape of the pressure control chamber including the valve body accommodation space may be appropriately changed. For example, the valve body accommodation space may be a simple columnar space. Further, the pressure control chamber may not be divided into a valve body accommodation space and a pressure acting space.

The first control valve body of the embodiments described above is divided into a valve closing member and a fitting member. However, the first control valve body may be formed by, for example, a single columnar member having both a valve closing member and a fitting portion. In addition, the first lift adjustment shim and the second lift adjustment shim of the first embodiment and the lift adjustment shim of the second embodiment may be omitted as appropriate. Similarly, a configuration corresponding to the second urging member of the first embodiment and the urging member of the second embodiment may be omitted as appropriate.

Figure 5:
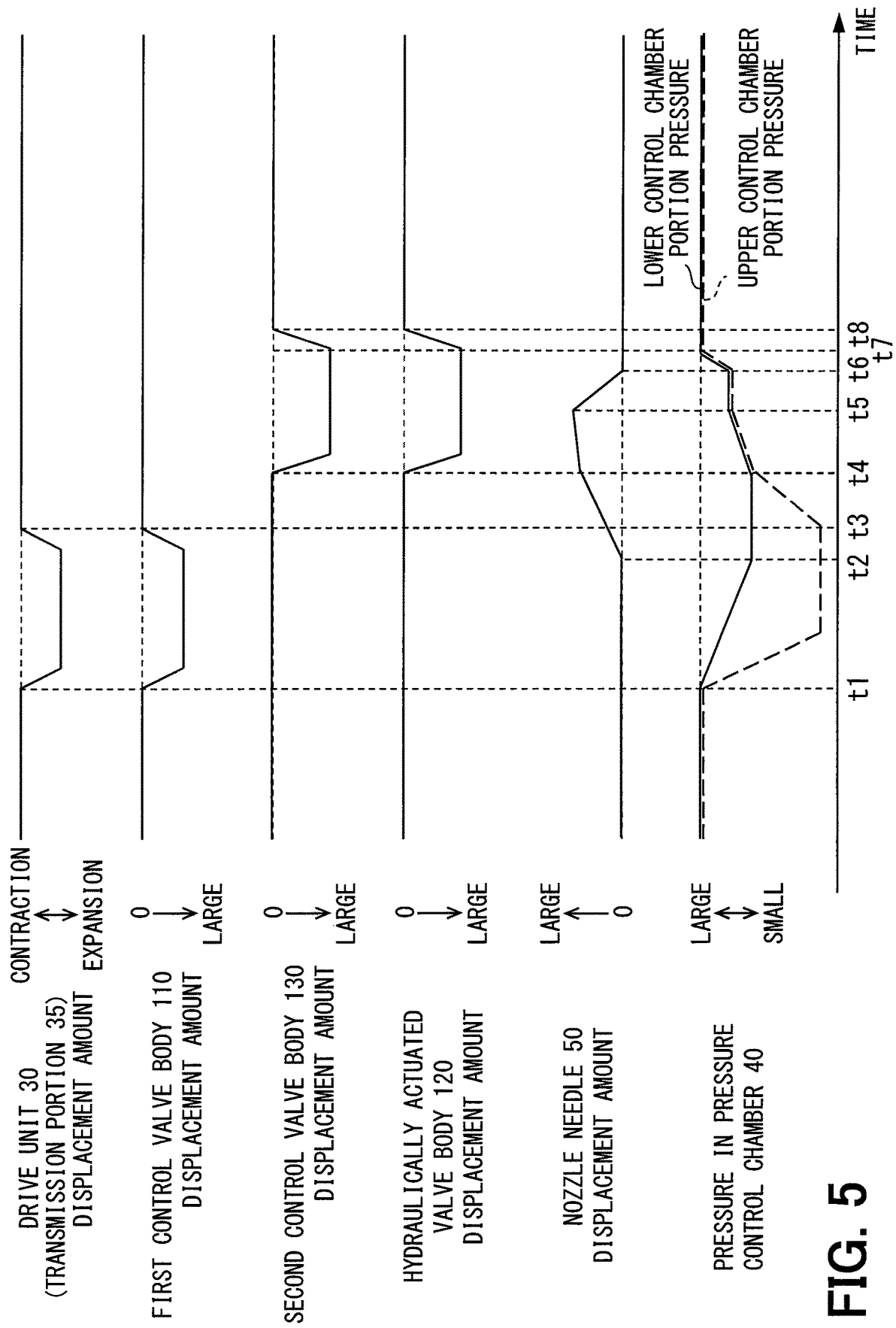
FIG. 5 is a time chart showing operation in a low-speed valve opening mode.
Figure 6:
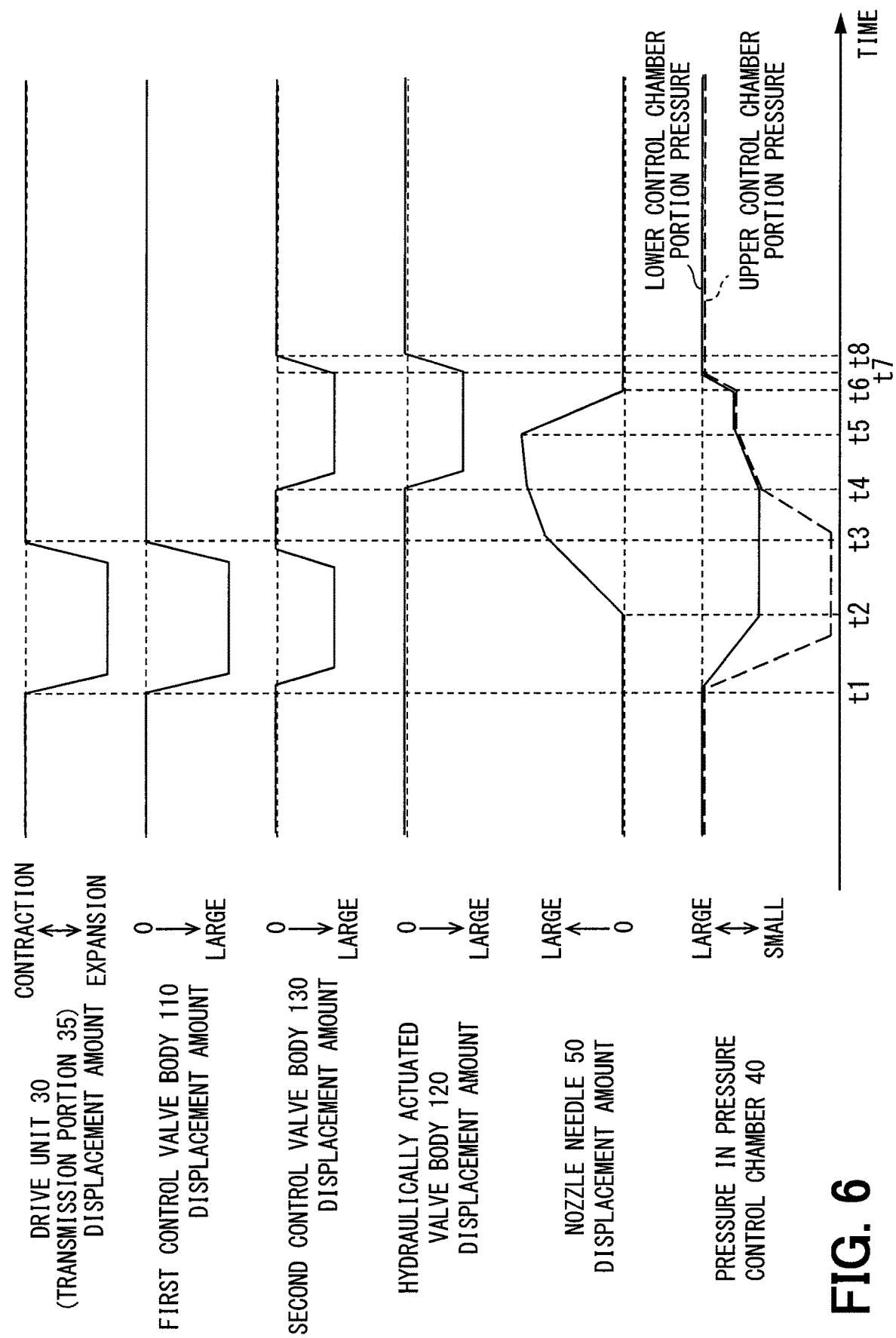
FIG. 6 is a time chart showing operation in a high-speed valve opening mode.
Figure 7:
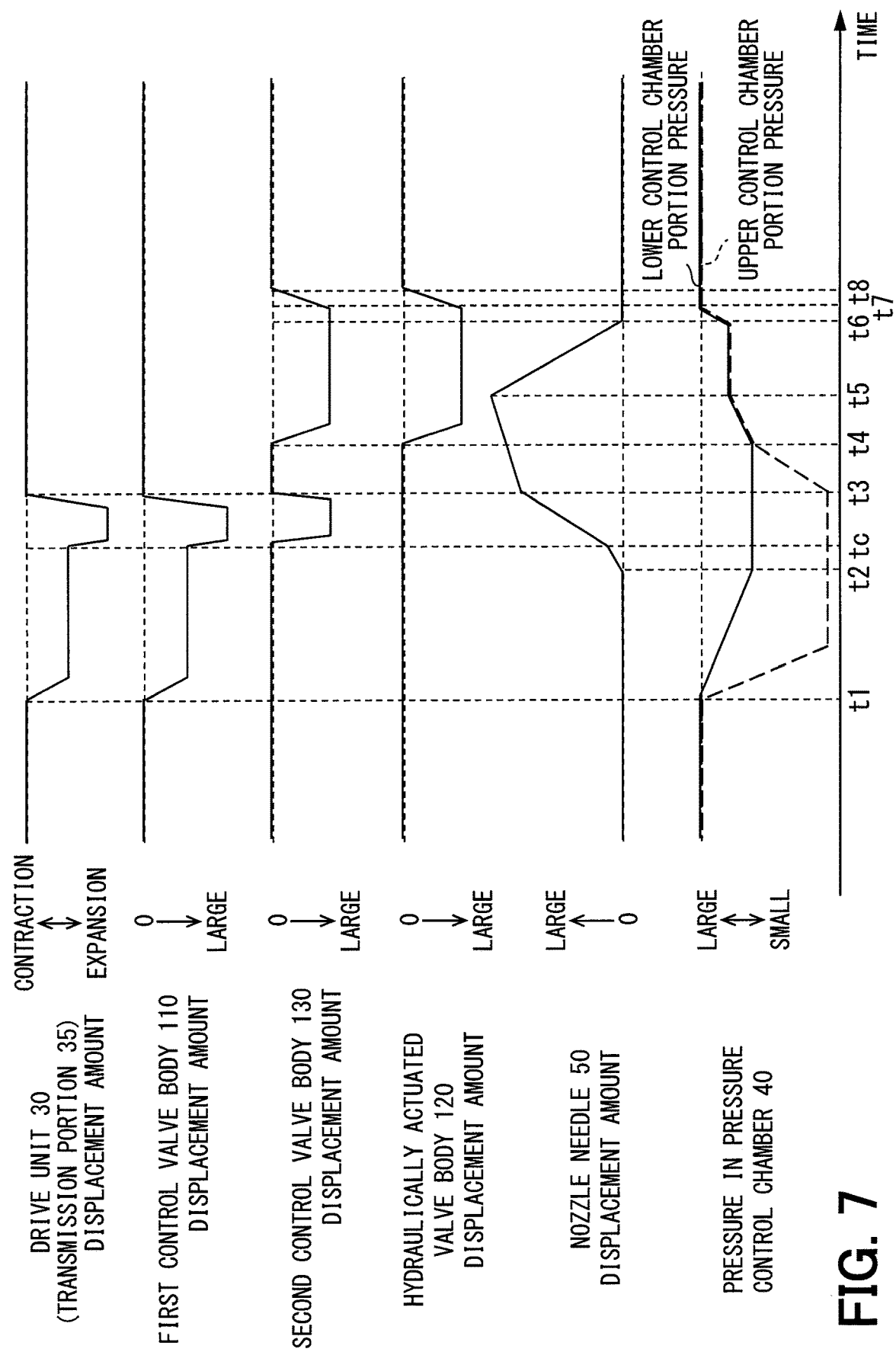
FIG. 7 is a time chart showing operation in a switching valve opening mode.

In a mode in which the urging member for urging the hydraulically actuated valve body in the valve closing direction is omitted, the hydraulically actuated valve body is unseated from the opening wall at a time t1 at which the first control valve body is opened (refer to FIG. 5 and the like). After opening of the first control valve body at the time t1, the hydraulically actuated valve body can be attracted to a relative negative pressure of the outflow opening portion and seated on the opening wall to close the inflow opening portion.

In the first embodiment described above, the control for switching from the low-speed valve opening mode to the high-speed valve opening mode has been described in detail as the switching valve opening mode. However, control for switching from the high-speed valve opening mode to the low-speed valve opening mode may be performed as the switching valve opening mode. In addition, a timing at which the drive energy is increased or decreased in the switching valve opening mode may also be appropriately changed. Further, multiple switching of the drive energy may be performed during one injection.

In the embodiments described above, an example in which the valve mechanism or the like of the present disclosure is applied to a fuel injection device for injecting a light oil as the fuel has been described, but the valve mechanism or the like of the present disclosure is also applicable to a fuel injection device for injecting a fuel other than the light oil, for example, a liquefied gas fuel such as dimethyl ether or the like.

The invention claimed is:
1. A fuel injection device configured to inject fuel from an injection hole toward a combustion chamber, the fuel injection device comprising:
　a valve body having the injection hole, a pressure control chamber configured to be filled with fuel, an inflow passage configured to allow fuel to flow into the pressure control chamber, and an outflow passage configured to allow fuel to flow out of the pressure control chamber, in which an inflow opening portion of the inflow passage and an outflow opening portion of the outflow passage are opened in an opening wall defining the pressure control chamber;
　a nozzle needle configured to be displaced relative to the valve body according to a variation in the fuel pressure in the pressure control chamber to open and close the nozzle hole;
　a valve mechanism that partitions the pressure control chamber into an upper control chamber portion, which faces the outflow opening portion, and a lower control chamber portion, and has at least one communication passage which communicates the upper control chamber portion with the lower control chamber portion, the valve mechanism configured to open and close the outflow opening portion and the inflow opening portion and to switch a flow channel area of the communication passage; and
　a drive unit configured to drive the valve mechanism and to increase and decrease an input drive energy, wherein the valve mechanism includes:
　　a first control valve body configured to be seated on and unseated from the opening wall by the drive of the drive unit and to open or close the outflow opening portion;
　　a hydraulically actuated valve body slidable on an outer peripheral surface of the first control valve body, the hydraulically actuated valve body configured to be seated on and unseated from the opening wall by a pressure difference generated between the upper control chamber portion and the lower control chamber portion and to open or close the inflow opening portion; and
　　a second control valve body configured to be seated on and unseated from the hydraulically actuated valve body while being driven by the drive unit via the first control valve body and to switch the communication passage from a first throttle state to a second throttle state larger in flow channel area than the first throttle state, wherein the hydraulically actuated valve body is configured to close the inflow opening portion by a force received from the fuel in the lower control chamber portion due to a communication between the upper control chamber portion and the outflow passage by unseating the first control valve body, the communication passage is configured to control an outflow flow rate of the fuel from the lower control chamber portion to the outflow passage in a state where the hydraulically actuated valve body closes the inflow opening portion, the drive unit is configured
  to receive a first drive energy to cause the first control valve body to be unseated from the opening wall while maintaining the seating of the second control valve body on the hydraulically actuated valve body and
  to cause the fuel to flow from the lower control chamber portion to the outflow passage through the communication passage in the first throttle state, and the drive unit is configured
  to receive a second drive energy larger than the first drive energy to cause both of the first control valve body and the second control valve body to be unseated and
  to cause the fuel to flow from the lower control chamber portion to the outflow passage through the communication passage in the second throttle state.

2. The fuel injection device according to claim 1, wherein the hydraulically actuated valve body defines, as the communication passage, a first communication passage and a second communication passage therein, the first communication passage communicates the upper control chamber portion and the lower control chamber portion with each other even when the second control valve body is seated on the hydraulically actuated valve body, and the second communication passage communicates the upper control chamber portion and the lower control chamber portion with each other by unseating of the second control valve body from the hydraulically actuated valve body.

3. The fuel injection device according to claim 2, wherein a flow channel area of the first communication passage is smaller than a flow channel area of the second communication passage.

4. The fuel injection device according to claim 1, wherein the first control valve body defines, as a part of the communication passage, a first passage section therein, the second control valve body defines, as part of the communication passage, a second passage section, which is smaller in flow channel area than the first passage section, therein, the communication passage is configured
  to control the outflow flow rate of the fuel from the lower control chamber portion to the outflow passage by the second passage section using the second passage section by making the first passage section and the second passage section continuous with each other by the seating of the second control valve body on the hydraulically actuated valve body, and
  to control the outflow flow rate of the fuel from the lower control chamber portion to the outflow passage using the first communication section by making the second passage section separated from the first passage section by the unseating of the second control valve body from the hydraulically actuated valve body.

5. The fuel injection device according to claim 4, wherein the second passage section is aligned in series with the first passage section in a displacement direction in which the drive unit is configured to displace the first control valve body.

6. The fuel injection device according to claim 1, wherein after closing of the first control valve body, the hydraulically actuated valve body is unseated from the opening wall by a force received from the high-pressure fuel in the inflow passage by reduction in pressure difference due to the fuel flow through the communication passage.

7. The fuel injection device according to claim 1, wherein the hydraulically actuated valve body is configured to displace the second control valve body in a direction away from the first control valve body due to the unseating from the opening wall.

8. The fuel injection device according to claim 1, wherein the first control valve body is formed with a fitting portion slidably fitted to the hydraulically actuated valve body while maintaining a liquid-tight state between the upper control chamber portion and the lower control chamber portion.

9. The fuel injection device according to claim 8, wherein the first control valve body includes:
  a valve closing member including
    a closing portion configured to close the outflow opening portion by seating on the opening wall and
    a spherical portion formed in a partial spherical shape and to receive transmission of a displacement of the drive unit; and
  a fitting member including a concave spherical contact portion configured to come in contact with the fitting portion and the spherical portion and to transmit the displacement of the valve closing member to the second control valve body.

10. The fuel injection device according to claim 1, wherein the valve mechanism further includes an urging member urging the first control valve body in a direction to close the outflow opening portion.

11. The fuel injection device according to claim 10, wherein the urging member is accommodated in a space other than the upper control chamber portion in the pressure control chamber.

12. The fuel injection device according to claim 11, wherein the valve mechanism further includes an intermediate member configured to transmit an urging force of the urging member accommodated in the space other than the upper control chamber portion to the first control valve body which is at least partially accommodated in the upper control chamber portion.

13. The fuel injection device according to claim 1, wherein
  the valve mechanism further includes a cylindrical member in a cylindrical shape and configured to urge the hydraulically actuated valve body in a direction to close the inflow opening portion, and
  the second control valve body is accommodated in a radially inner side of the cylindrical member.

14. The fuel injection device according to claim 1, wherein the pressure control chamber has:
  a valve body accommodation space accommodating the valve mechanism;
  a pressure acting space configured to exert a fuel pressure on the nozzle needle; and a pressure control communication passage configured to communicate between the valve body accommodation space and the pressure acting space to cause a fuel pressure in the pressure acting space to follow a fuel pressure in the valve body accommodation space.

15. The fuel injection device according to claim 14, wherein the valve body accommodation space is in a columnar space, the hydraulically actuated valve body has a cylindrical first outer peripheral wall, the second control valve body has a second outer peripheral wall smaller in outer diameter than the first outer peripheral wall, and an inner diameter of a first wall portion of a columnar inner peripheral wall defining the valve body accommodation space, which faces the first outer peripheral wall in a radial direction, is larger than an inner diameter of a second wall portion which faces the second outer peripheral wall in the radial direction.

16. The fuel injection device according to claim 14, wherein a volume of the pressure acting space is smaller than a volume of the valve body accommodation space.

\* \* \* \* \*

UNITED STATES PATENT AND TRADEMARK OFFICE
CERTIFICATE OF CORRECTION

PATENT NO. : 10,808,661 B2
APPLICATION NO. : 16/533863
DATED : October 20, 2020
INVENTOR(S) : Tanada Page 1 of 1

It is certified that error appears in the above-identified patent and that said Letters Patent is hereby corrected as shown below:

On the Title Page

Item (30) reads:
(30) Foreign Application Priority Data
Dec. 22, 2017 (JP) ...........................2017-031369

Should read:
(30) Foreign Application Priority Data
Feb. 22, 2017 (JP) ...........................2017-031369

Signed and Sealed this
Twenty-second Day of December, 2020

Andrei Iancu
*Director of the United States Patent and Trademark Office*